United States Patent
Hong

(10) Patent No.: US 11,510,069 B2
(45) Date of Patent: Nov. 22, 2022

(54) METHOD AND APPARATUS OF WIRELESS BACKHAUL CONNECTION

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 133 days.

(21) Appl. No.: 17/048,506

(22) PCT Filed: Apr. 24, 2018

(86) PCT No.: PCT/CN2018/084292
§ 371 (c)(1),
(2) Date: Oct. 16, 2020

(87) PCT Pub. No.: WO2019/204991
PCT Pub. Date: Oct. 31, 2019

(65) Prior Publication Data
US 2021/0176647 A1    Jun. 10, 2021

(51) Int. Cl.
*H04W 16/18* (2009.01)
*H04W 24/10* (2009.01)

(52) U.S. Cl.
CPC ........... *H04W 16/18* (2013.01); *H04W 24/10* (2013.01)

(58) Field of Classification Search
CPC ............. H04W 28/0815; H04W 24/10; H04W 84/045; H04W 76/14; H04W 92/20; H04W 16/18
See application file for complete search history.

(56) References Cited

U.S. PATENT DOCUMENTS

2017/0078912 A1    3/2017    Li

FOREIGN PATENT DOCUMENTS

| CN | 103731897 A | 4/2014 |
|----|-------------|--------|
| CN | 106028359 A | 10/2016 |

(Continued)

OTHER PUBLICATIONS

International Search Report issued in Application No. PCT/CN2018/084292 dated Jan. 22, 2019 with English translation, (4p).

(Continued)

*Primary Examiner* — Mehmood B. Khan
(74) *Attorney, Agent, or Firm* — Arch & Lake LLP

(57) ABSTRACT

A method and an apparatus are provided for wireless backhaul connection. When receiving, from the wireless backhaul base station, connection requirement information for donor base stations, the LTE base station determines a first number of donor base stations required by the wireless backhaul base station for wireless backhaul connection according to the connection requirement information. The LTE base station determines a second number of donor base stations that are capable of providing wireless backhaul service to the wireless backhaul base station. The LTE base station determines, for the wireless backhaul base station, donor base stations for wireless backhaul connection according to the first number and the second number. The wireless backhaul base station and the first number of donor base stations and the second number of base stations are located in a coverage area of the LTE base station.

19 Claims, 11 Drawing Sheets

--- when the first number is less than or equal to the second number, selecting the first number of donor base stations that are capable of providing wireless backhaul service to the wireless backhaul base station, and configuring the selected donor base stations as donor base stations for wireless backhaul connection — 410

Generating a first notification message, which includes respective base station identifiers of the first number of the donor base stations for wireless backhaul connection — 420

Sending, to the wireless backhaul base station, the first notification message so that the wireless backhaul base station determines the donor base stations for wireless backhaul connection according to the base station identifiers in the first notification message, and establishing connections with the determined donor base stations — 430

(56) References Cited

FOREIGN PATENT DOCUMENTS

| CN | 106162817 | A | | 11/2016 | | |
|---|---|---|---|---|---|---|
| EP | 3209051 | A1 | * | 8/2017 | ............ | H04W 16/24 |
| EP | 3209051 | A1 | | 8/2017 | | |
| EP | 3606180 | B1 | * | 8/2020 | ............ | H04B 7/2606 |
| WO | WO-2012064600 | A1 | * | 5/2012 | ............ | H04W 68/02 |
| WO | 2012105881 | A1 | | 8/2012 | | |
| WO | 2014051630 | A1 | | 4/2014 | | |
| WO | 2015180010 | A1 | | 12/2015 | | |
| WO | WO-2020080044 | A1 | * | 4/2020 | ............ | H04W 40/12 |

OTHER PUBLICATIONS

AT&T, Qualcomm, Samsung, "New SID Proposal: Study on Integrated Access and Backhaul for NR", 8881123GPP TSG RAN Meeting #75, Dubrovnik, Croatia, RP-170821, Mar. 6-9, 2017, (5p).
Intellectual property India, Office Action Issued in Application No. 202047048175, dated Dec. 7, 2021, (5p).
First Office Action issued to Chinese Application No. 201880000445.6 dated Aug. 25, 2021 with English translation, (10p).
First Office Action issued to Chinese Application No. 201880000445.6 dated May 25, 2021 with English translation, (10p).
Written Opinion of the International Searching Authority issued in Application No. PCT/CN2018/084292 dated Jan. 22, 2019, (11p).
European Patent Office, Extended European Search Report Issued in Application No. 18916058.3 dated Feb. 9, 2021, (9p).

* cited by examiner

METHOD AND APPARATUS OF WIRELESS BACKHAUL CONNECTION

CROSS-REFERENCE TO RELATED APPLICATIONS

The present application is the US national phase of PCT international application PCT/CN2018/084292, filed on Apr. 24, 2018, the entirety of which is incorporated herein by reference for all purposes.

TECHNICAL FIELD

Embodiments of the present disclosure relate to a method and an apparatus of wireless backhaul connection.

BACKGROUND

In the new generation communication system, in order to satisfy the requirements of diversified, high-speed, and large number of network services, the spectrum efficiency needs to be greatly improved, and the high-frequency communication technology is an important candidate technology for the new generation communication system to improve the spectrum efficiency. Due to the transmission characteristics of high frequency bands, small cells are typically used for high frequency communication. However, if each small cell is provided with conventional wired backhaul, such as optical fibers, this will cause a lot of overhead. Especially, in some places where fiber optics cannot be deployed, poor communication will be caused.

SUMMARY

According to a first aspect of the present disclosure, a method of wireless backhaul connection is provided, the method is applicable to a long-term evolution LTE base station, a wireless backhaul base station and one or more donor base stations are located in a coverage area of the LTE base station, the method includes:

determining, when receiving connection requirement information for donor base stations from the wireless backhaul base station, a first number of donor base stations required by the wireless backhaul base station for wireless backhaul connection according to the connection requirement information;

determining a second number of donor base stations which are capable of providing wireless backhaul service to the wireless backhaul base station; and configuring, for the wireless backhaul base station, at least one donor base station for wireless backhaul connection according to the first number and the second number.

In an embodiment of the present disclosure, the connection requirement information includes an expected number of connections configured by the wireless backhaul base station;

determining the first number of the first donor base stations required by the wireless backhaul base station for wireless backhaul connection according to the connection requirement information, including:

determining the expected number of connections as the first number.

In an embodiment of the present disclosure, the connection requirement information includes an expected service type and/or an expected quality of service configured by the wireless backhaul base station;

determining the first number of the first donor base stations required by the wireless backhaul base station for wireless backhaul connection according to the connection requirement information includes:

determining the first number according to the expected service type and/or expected quality of service.

In an embodiment of the present disclosure, determining the second number of donor base stations that are capable of providing wireless backhaul service to the wireless backhaul base station includes:

configuring a measurement parameter to measure each of designated donor base stations which are located in the coverage area of the LTE base station;

sending, to the wireless backhaul base station, the measurement parameter so that the wireless backhaul base station performs measurement on each of the designated donor base stations according to the measurement parameter to obtain a measurement result;

receiving, from the wireless backhaul base station, measurement report information which includes the measurement result;

determining the second number of the donor base stations that are capable of providing wireless backhaul service to the wireless backhaul base station according to the measurement result.

In an embodiment of the present disclosure, the measurement parameter includes at least one of following parameters:

a list of the designated donor base stations that includes each of the designated donor base stations;

a measurement quantity of specified measurement; and a specified trigger condition for measurement.

In an embodiment of the present disclosure, the measurement quantity of the specified measurement includes: reference signal received power (RSRP); or reference signal received quality (RSRQ); or a load size; or RSRP and a load size; or RSRQ and a load size.

In an embodiment of the present disclosure, the specified trigger condition for measurement includes a periodic trigger or an event trigger.

In an embodiment of the present disclosure, configuring, for the wireless backhaul base station, donor base stations for wireless backhaul connection according to the first number and the second number includes:

selecting, when the first number is less than or equal to the second number, the first number of donor base stations that are capable of providing wireless backhaul service to the wireless backhaul base station, and configure the selected donor base stations as the donor base stations for wireless backhaul connection;

generating a first notification message which includes respective base station identifiers of the first number of donor base stations for wireless backhaul connection;

sending, to the wireless backhaul base station, the first notification message so that the wireless backhaul base station determines donor base station for wireless backhaul connection according to the base station identifiers in the first notification message, and establishes connections with the determined donor base stations.

In an embodiment of the present disclosure, configuring, for the wireless backhaul base station, the donor base stations for wireless backhaul connection according to the first number and the second number includes:

Generating, when the first number is greater than the second number, connection response information for the connection requirement information, wherein the connection response information includes the second number;

sending the connection response information to the wireless backhaul base station;

configuring, when indication information received from the wireless backhaul base station indicates acceptance of the second number, all of the second number of the donor base stations that are capable of providing wireless backhaul service to the wireless backhaul base station as donor base stations for wireless backhaul connection;

generating a second notification message which includes respective base station identifiers of the second number of donor base stations for wireless backhaul connection;

sending, to the wireless backhaul base station, the second notification message so that the wireless backhaul base station determines donor base stations for wireless backhaul connection according to the base station identifiers in the second notification message, and establishes connections with the determined donor base stations.

In an embodiment of the present disclosure, configuring, for the wireless backhaul base station, the donor base stations for wireless backhaul connection according to the first number and the second number includes:

when the first number is greater than the second number, configuring all of the second number of donor base stations that are capable of providing wireless backhaul service to the wireless backhaul base station as the donor base stations for wireless backhaul connection;

generating a third notification message which includes respective base station identifiers of the second number of donor base stations for wireless backhaul connection;

sending, to the wireless backhaul base station, the third notification message so that the wireless backhaul base station determines donor base stations for wireless backhaul connection according to the base station identifiers in the third notification message, and establishes connections with the determined donor base stations.

According to a second aspect of the present disclosure, a method of wireless backhaul connection is provided. The method is applicable to a wireless backhaul base station, and the wireless backhaul base station and one or more donor base stations are located in a coverage area of a long-term evolution LTE base station, wherein the method includes:

generating connection requirement information for donor base stations;

sending, to the LTE base station, the connection requirement information so that the LTE base station determines a first number of donor base stations required by the wireless backhaul base station for wireless backhaul connection according to the connection requirement information, and determines a second number of donor base stations that are capable of providing wireless backhaul service to the wireless backhaul base station.

In an embodiment of the present disclosure, the connection requirement information includes an expected number of connections configured by the wireless backhaul base station.

In an embodiment of the present disclosure, the connection requirement information includes an expected service type and/or an expected quality of service configured by the wireless backhaul base station.

In an embodiment of the present disclosure, the method further includes:

receiving, from the LTE base station, a measurement parameter to measure each of designated donor base stations which are located in the coverage area of the LTE base station;

performing measurement on each of the designated donor base stations according to the measurement parameter to obtain a measurement result;

adding the measurement result to measurement report information for reporting the measurement;

sending, to the LTE base station, the measurement report information so that the LTE base station determines a second number of the donor base stations that are capable of providing wireless backhaul service to the wireless backhaul base station according to the measurement result in the measurement report information.

In an embodiment of the present disclosure, the measurement parameter includes at least one of following parameters:

a list of designated donor base stations that includes each of the designated donor base stations;

a measurement quantity of specified measurement; and a specified trigger condition for measurement.

In an embodiment of the present disclosure, the measurement quantity of specified measurement includes: reference signal received power RSRP; or reference signal received quality RSRQ; or a load size; or RSRP and a load size; or RSRQ and a load size.

In an embodiment of the present disclosure, the specified trigger condition for measurement includes a periodic trigger or an event trigger.

In an embodiment of the present disclosure, the method further includes:

receiving, from the LTE base station, a first notification message which includes respective base station identifiers of the first number of the donor base stations for wireless backhaul connection, wherein the first notification message is generated by the LTE base station in response to determining that the first number is less than or equal to the second number; and determining donor base stations for wireless backhaul connection according to the base station identifiers in the first notification message, and establish connections with the determined donor base stations.

In an embodiment of the present disclosure, the method further includes:

receiving, from the LTE base station, connection response information for the connection requirement information, wherein the connection response information comprises the second number, and is generated by the LTE base station in response to determining that the first number is greater than the second number;

generating, when the second number is accepted, indication information which indicates acceptance of the second number;

sending, to the LTE base station, the indication information so that the LTE base station configures all of the second number of donor base stations that are capable of providing wireless backhaul service to the wireless backhaul base station as donor base stations for wireless backhaul connection according to the indication information;

receiving, from the LTE base station, a second notification message which includes respective base station identifiers of the second number of the donor base stations for wireless backhaul connection;

determining donor base stations for wireless backhaul connection according to the base station identifiers in the second notification message, and establishing connections with the determined donor base stations.

In an embodiment of the present disclosure, the method further includes:

receiving, from the LTE base station, a third notification message which includes respective base station identities of the second number of the donor base stations, wherein the third notification message is generated by the LTE base station in response to determining that the first number is greater than the second number; and determining donor base stations for wireless backhaul connection according to the base station identifiers in the third notification message, and establish connections with the determined donor base stations.

According to a third aspect of the present disclosure, there is provided a non-transitory computer-readable storage medium with a computer program stored thereon, and the computer program is configured to perform the method of wireless backhaul connection according to the first aspect as mentioned above.

According to a fourth aspect of the present disclosure, there is provided a non-transitory computer-readable storage medium with a computer program stored thereon, and the computer program is configured to perform the method of wireless backhaul connection according to the second aspect as mentioned above.

According to a fifth aspect of the present disclosure, there is provided an apparatus of wireless backhaul connection, the apparatus is applicable to an LTE base station, and a wireless backhaul base station and one or more donor base stations are located in a coverage area of the LTE base station, the apparatus includes:

a memory, configured to store instructions executable by a processor;

wherein, the processor is configured to:

determine, when receiving, from the wireless backhaul base station, a connection requirement information for donor base stations, a first number of donor base stations required by the wireless backhaul base station for wireless backhaul connection according to the connection requirement information for donor base stations;

determining a second number of donor base stations that are capable of providing wireless backhaul service to the wireless backhaul base station; and configuring, for the wireless backhaul base station, donor base stations for wireless backhaul connection according to the first number and the second number.

According to an sixth aspect of the present disclosure, there is provided an apparatus of wireless backhaul connection, the apparatus is applicable to a wireless backhaul base station, the wireless backhaul base station and one or more donor base stations are located in a coverage area of the LTE base station, and the device includes:

a memory, configured to store instructions executable by a process;

wherein, the processor is configured to:

generate connection requirement information for donor base stations; and send, to the LTE base station, the connection requirement information so that the LTE base station determines a first number of donor base stations required by the wireless backhaul base station for wireless backhaul connection, and determines a second number of donor base stations that are capable of providing wireless backhaul service to the wireless backhaul base station.

It should be understood that the above general description and the following detailed description are just exemplary and explanatory, and cannot construed as a limit to the present disclosure.

BRIEF DESCRIPTION OF THE DRAWINGS

The drawings herein are incorporated into the specification and constitute a part of the specification, illustrate embodiments in accordance with the present disclosure, and are used to explain the principle of the present disclosure along with the specification.

DETAILED DESCRIPTION OF THE EMBODIMENTS

Exemplary embodiments will be described in detail here, and examples thereof are illustrated in the accompanying drawings. When the following description relates to the drawings, unless otherwise indicated, the same reference signs in different drawings indicate the same or similar elements. The implementation manners described in the following exemplary embodiments do not represent all implementation manners consistent with the present disclosure. Rather, they are merely examples of devices and methods consistent with some aspects of the present disclosure as set forth in the appended claims.

The terms used in the present disclosure are only for the purpose of describing specific embodiments, and are not intended to limit the present disclosure. The singular forms "a", "said" and "the" used in the present disclosure and appended claims are also intended to include plural forms, unless the context clearly indicates other meanings. It should further be understood that the term "and/or" used herein refers to and includes any or all possible combinations of one or more associated listed items.

It should be understood that although the terms first, second, third, etc. may be used in the present disclosure to describe various information, the information should not be limited to these terms. These terms are only used to distinguish the same type of information from each other. For example, without departing from the scope of the present disclosure, the indication information may also be referred to as a second information, and similarly, the second information may also be referred to as an indication information. Depending on the context, the word "if" as used herein can be interpreted as "upon" or "when" or "in response to determination".

Figure 1:
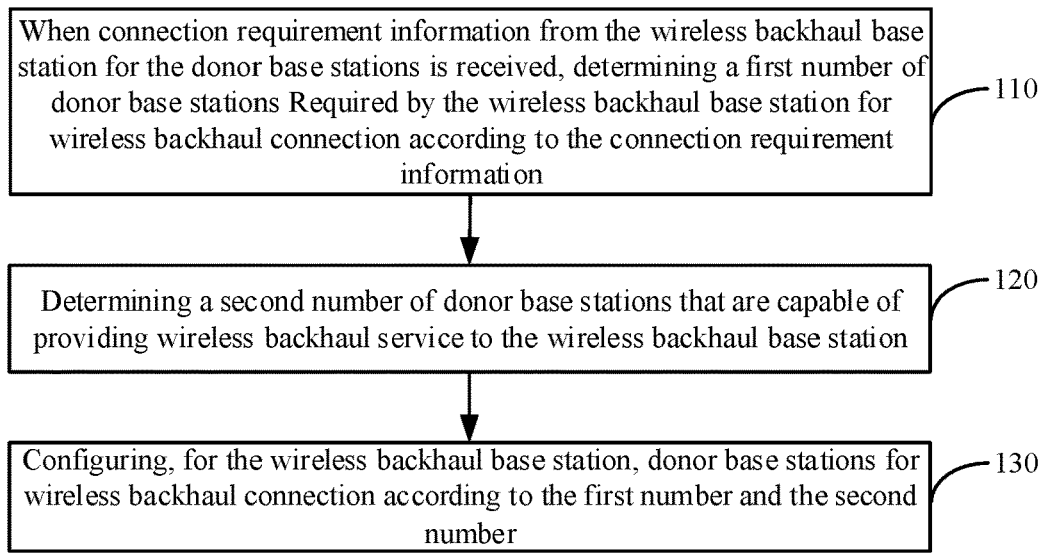
FIG. 1 is a flow chart illustrating a method of wireless backhaul connection according to an exemplary embodiment.
Figure 2:
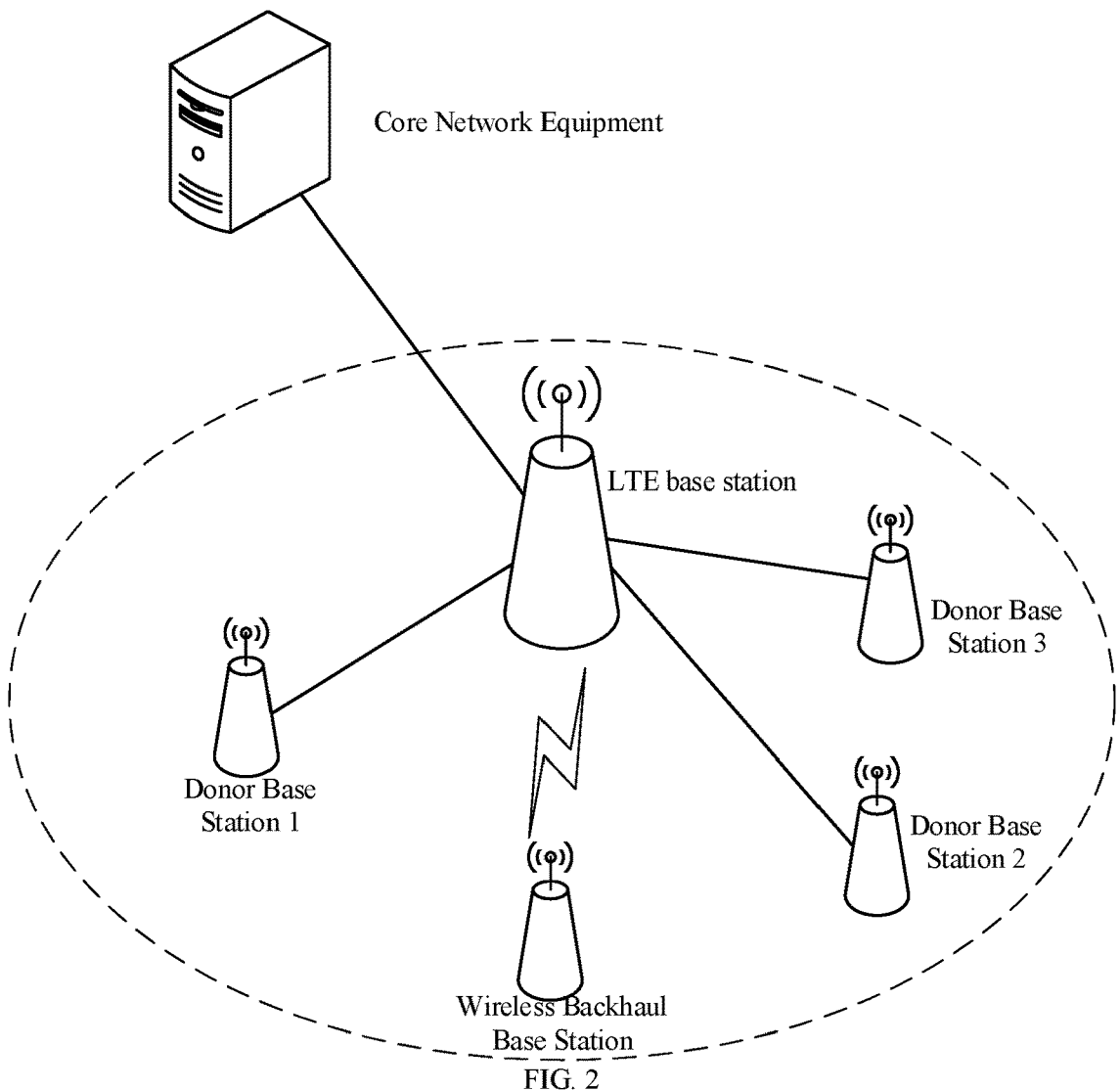
FIG. 2 is an application scenario diagram of a method of wireless backhaul connection according to an exemplary embodiment.

FIG. 1 is a flowchart of a method of wireless backhaul connection according to an exemplary embodiment, and FIG. 2 is an application scenario diagram of a method of wireless backhaul connection according to an exemplary embodiment. The method of wireless backhaul connection may be applicable to an LTE (Long Term Evolution) base station. A wireless backhaul base station and one or more donor base stations are located in the coverage area of the LTE base station. Both the wireless backhaul base station and the donor base stations may be new radio (NR) small cells. As illustrated in FIG. 1, the method of wireless backhaul connection includes the following steps 110-130:

In step 110, when connection requirement information from the wireless backhaul base station for the donor base stations is received, a first number of donor base stations required by the wireless backhaul base station for wireless backhaul connection is determined according to the connection requirement information.

In the embodiments of the present disclosure, the LTE base station may be a macro base station with a wide coverage area, and the wireless backhaul base station can transmit data to the core network equipment only through the LTE base station or a donor base station that the LTE base station configures for the wireless backhaul base station.

When the wireless backhaul base station requires a donor base station, it may inform the LTE base station of its connection requirement information, so that the LTE base station may determine a first number of donor base stations required by the wireless backhaul base station for wireless backhaul connection according to the connection requirement information of the wireless backhaul base station. In an embodiment of the present disclosure, the first number may be equal to or greater than one.

In an embodiment of the present disclosure, the connection requirement information from the wireless backhaul base station may include an expected number of connections configured by the wireless backhaul base station; when step 110 is performed, the expected number of connections may be directly determined as the first number of the donor base stations required by the wireless backhaul base station for wireless backhaul connection.

For example, when the expected number of connections is 3, the first number is 3.

In an embodiment of the present disclosure, the connection requirement information from the wireless backhaul base station may include an expected service type and/or an expected quality of service (QoS) configured by the wireless backhaul base station; when step 110 is performed, the first number of donor base stations required by the wireless backhaul base station for wireless backhaul connection may be determined according to the expected service type and/or the expected quality of service. In an embodiment of the present disclosure, the service type may refer to various services such as Internet service and video service; and the quality of service may refer to performance index corresponding to these various services such as Internet services and video services. Moreover, the performance index may refer to a data packet delay, a packet loss rate, and so on.

When the data packet delay required by the QoS of a certain service is very small, the LTE base station can configure, for the wireless backhaul base station, more donor base stations as backup, such as 4-5, so that a backup base station can be rapidly found to provide service to the wireless backhaul base station after disconnection of a current serving donor base station, so as to reduce interruption delay. When the data packet delay required by the QoS of a certain service is large, the LTE base station can configure, for the wireless backhaul base station, fewer donor base stations as backup, such as 1-2.

In step 120, a second number of donor base stations that are capable of providing wireless backhaul service to the wireless backhaul base station are determined.

In the embodiments of the present disclosure, more than one donor base stations may be located in the coverage area of the LTE base station, and all of the donor base stations may be capable of providing wireless backhaul service to the wireless backhaul base station, or only some of the donor base stations may be capable of providing wireless backhaul service to the wireless backhaul base station, and then, the LTE base station needs to determine the second number of donor base stations that are capable of providing the wireless backhaul service to the wireless backhaul base station within its coverage area.

In an embodiment of the present disclosure, when step 110 is performed, the second number of donor base stations that are capable of providing wireless backhaul service to the wireless backhaul base station may be determined according to a measurement result of the donor base stations by the wireless backhaul base station. Please refer to the embodiment illustrated in FIG. 3 for the exemplary implementation process.

In an embodiment of the present disclosure, the measurement result of the donor base stations may include:

a measurement value of RSRP (Reference Signal Receiving Power) of the donor base stations, or a measurement value of RSRQ (Reference Signal Receiving Quality) of the donor base stations.

In addition, the measurement result of the donor base stations may further include a measurement value of load of the donor base stations.

In step 130, donor base stations for wireless backhaul connection are configured for the wireless backhaul base station according to the first number and the second number.

In the embodiments of the present disclosure, the first number is the number of donor base stations required by the wireless backhaul base station for wireless backhaul connection, as determined by the LTE base station; and the second number is the number of donor base stations that are capable of providing wireless backhaul service to the wireless backhaul base station, as determined by the LTE base station. In other words, the second number here may refer to the maximum number of donor base stations that the LTE base stations can configure for the wireless backhaul base station; and the first number may refer to the minimum number of donor base stations that the LTE base station configures which can satisfy the connection requirement of the wireless backhaul base station. As for how many donor base stations that are finally configured by the LTE base station for the wireless backhaul base station, respective donor base stations that are finally configured needs to be determined according to the relationship between the first number and the second number.

In one embodiment of the present disclosure, when step 130 is performed, when the first number is less than or equal to the second number, it means that there are more donor base stations that are capable of providing wireless backhaul service to the wireless backhaul base station than the donor base stations required by the wireless backhaul base station. In other words, the LTE base station can meet the connection requirement of wireless backhaul base station. At this time, the LTE base station may select the first number of donor base stations that are capable of providing wireless backhaul service to the wireless backhaul base station, and configure the selected donor base stations as a donor base station for wireless backhaul connection. Please refer to the embodiment illustrated in FIG. 4 for the exemplary implementation process.

In one embodiment of the present disclosure, when step 130 is performed, when the first number is greater than the second number, it means that the donor base stations that are capable of providing wireless backhaul service to the wireless backhaul base station is less than the donor base stations required by the wireless backhaul base station, that is, the LTE base station cannot satisfy the connection requirement of the wireless backhaul base station. At this time, it is possible to determine how many donor base stations are ultimately configured for the wireless backhaul base station according to various connection requirement information of the wireless backhaul base station.

For example, the connection requirement information from the wireless backhaul base station includes an expected number of connections configured by the wireless backhaul base station, and the first number determined by the LTE base station is the same as the expected number of connections, but the LTE base station can only configure the second number of donor base stations for the wireless backhaul base station and the second number is less than the first number. In such a case, the LTE base station may ask the wireless backhaul base station whether to accept the second number or not, and then configure, for the wireless backhaul base station, the second number of donor base stations. Please refer to the embodiment illustrated in FIG. 5 for the specific implementation process.

For another example, the connection requirement information from the wireless backhaul base station includes an expected service type and/or an expected quality of service configured by the wireless backhaul base station, and the first number determined by the LTE base station is an estimated value determined by the LTE base station according to the expected service type and/or the expected quality of service, but the LTE base station can only configure, for the wireless backhaul base station, a second number of donor base stations, and the second number is less than the first number. In such a case, the LTE base station can ultimately determine to configure, for the wireless backhaul base station, the second number of donor base stations. Please refer to the embodiment illustrated in FIG. 6 for the exemplary implementation process.

In an exemplary application scenario, as illustrated in FIG. 2, the application scenario diagram is a schematic diagram of a Non-Standalone (NSA) architecture, which includes core network equipment, an LTE base station, a donor base station 1, a donor base station 2, a donor base station 3, and a wireless backhaul base station. The core network equipment is located outside the coverage area of the LTE base station, while the donor base station 1, the donor base station 2, the donor base station 3, and the wireless backhaul base station are all located in the coverage area of the LTE base station.

The LTE base station and the core network equipment are wiredly connected, all the connections between the LTE base station and the donor base station 1, the donor base station 2, and the donor base station 3 are wired, and the LTE base station and the wireless backhaul base station are wireless. In addition, the connections between the LTE base station and the donor base station 1, the donor base station 2, and the donor base station 3 are all wired backhaul connections, and the connection between the LTE base station and the wireless backhaul base station is wireless backhaul connection.

In addition, the LTE base station may be a macro base station with a wide coverage area; the donor base station 1, the donor base station 2, and the donor base station 3 may all be NR small cells, and they can facilitate the wireless backhaul base station to transmit data to the core network equipment. The wireless backhaul base station may also be an NR small cell, but it can only transmit data to the core network equipment through the LTE base station or a donor base station (such as the donor base station 1) configured for the wireless backhaul base station by the LTE base station.

When the LTE base station receives, from the wireless backhaul base station, a connection requirement information for donor base station, it determines a first number (for example, 2) of the donor base stations required by the wireless backhaul base station for wireless backhaul connection according to the connection requirement information, and determines a second number of donor base stations that are capable of providing wireless backhaul service to the wireless backhaul base station (for example, 3, that is, the donor base station 1, the donor base station 2, and the donor base station 3 are all capable of providing wireless backhaul service to the wireless backhaul base station), and then the LTE base station may configure, for the wireless backhaul base station, donor base stations for wireless backhaul connection according to the first number and the second number. For example: the LTE base station selects two donor base stations from the donor base station 1, the donor base station 2, and the donor base station 3, and the selected donor base stations are configured as donor base stations for wireless backhaul connection (for example, the selected two donor base stations are the donor base station 1 and the donor base station 2).

It can be seen from the above embodiment that, when the connection requirement information for donor base station is received from the wireless backhaul base station, the first number of donor base stations required by the wireless backhaul base station for wireless backhaul connection can be determined according to the connection requirement information, and the second number of the donor base stations that are capable of providing wireless backhaul service to the wireless backhaul base station is determined. When the first number is less than or equal to the second number, donor base stations for wireless backhaul connection are configured for the wireless backhaul base station according to the first number and the second number. In this way, the wireless backhaul base station can access multiple donor base stations at the same time, thereby realizing the redundant connections of the wireless backhaul base station, guaranteeing the service continuity of the wireless backhaul base station, and improving the reliability of the wireless backhaul connection.

Figure 3:
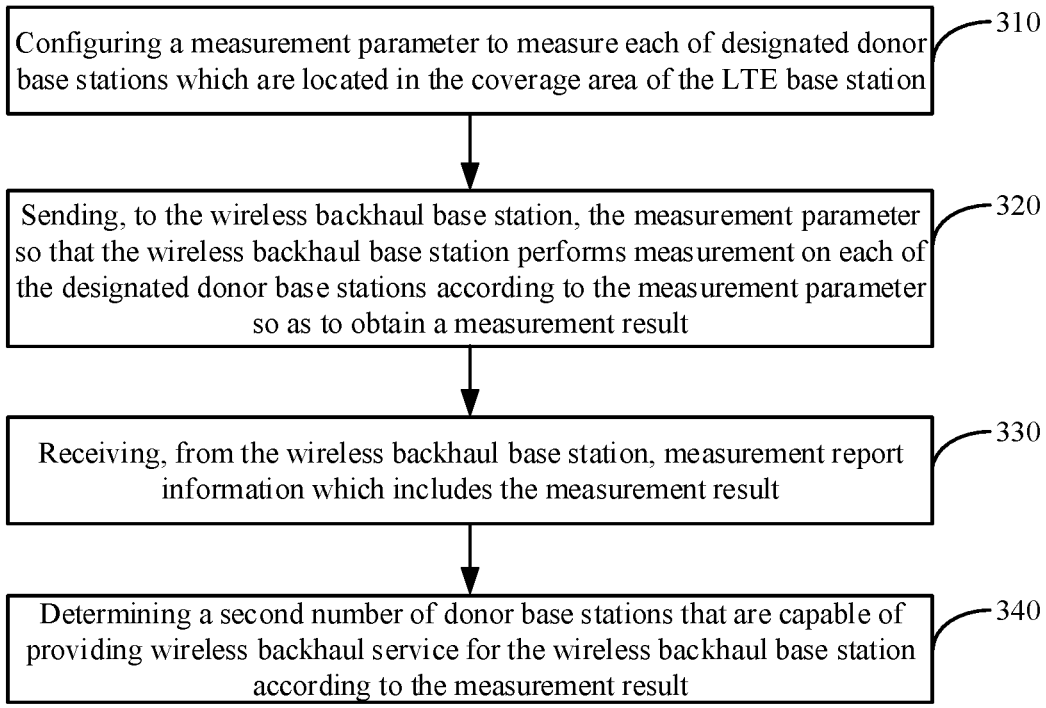
FIG. 3 is a flow chart illustrating another method of wireless backhaul connection according to an exemplary embodiment.

FIG. 3 is a flow chart illustrating another method of wireless backhaul connection according to an exemplary embodiment. The method of wireless backhaul connection is applicable to an LTE base station, and a wireless backhaul base station and one or more donor base stations are located in a coverage area of the LTE base station. The wireless backhaul base station and the donor base stations may both be NR small cells. The method is based on the method illustrated in FIG. 1, as illustrated in FIG. 3, when step 120 is performed, the second number of donor base stations that are capable of providing wireless backhual service to the wireless backhual base station are determined according to a measurement result of the donor base stations by the wireless backhaul base station. For example, the step 120 may include steps 310-340.

In step 310, a measurement parameter is configured to measure each of designated donor base stations which are located in the coverage area of the LTE base station.

In the embodiments of the present disclosure, the designated donor base stations may refer to all the donor base stations located in the coverage area of the LTE base station, or a part among all the donor base stations located in the coverage area of the LTE base station. As for whether it is all or a part, it is determined by the LTE base station on its own according to the actual situation. For example, as illustrated in FIG. 2, the designated donor base stations refer to the donor base station 1, the donor base station 2, and the donor base station 3. For another example: as illustrated in FIG. 2, the designated donor base stations only refer to the donor base station 1 and the donor base station 2.

In an embodiment of the present disclosure, the measurement parameter in the step 310 may include at least one of following parameters:

(1-1) a list of the designated donor base stations that includes each of the designated donor base stations;

(1-2) a measurement quantity of specified measurement; and (1-3) a specified trigger condition for measurement.

In an embodiment of the present disclosure, the measurement quantity of specified measurement in (1-2) above may include: RSRP; or RSRQ; or a load size; or RSRP and a load size; or RSRQ and a load size.

In an embodiment of the present disclosure, the specified trigger condition for measurement in (1-3) above includes a periodic trigger or an event trigger. Among them, the periodic trigger refers to trigger measurement report at a certain time period, such as: 1 minute; the event trigger refers to trigger measurement report upon occurrence of a specified event, such as: a measurement value of RSRP or a measurement value of RSRQ of a donor base station exceeds a set threshold.

In step 320, the measurement parameter is sent to the wireless backhaul base station, so that the wireless backhaul base station performs measurement on each of the designated donor base stations according to the measurement parameter so as to obtain a measurement result.

In an embodiment of the present disclosure, when the measurement quantity of designated measurement includes RSRP or RSRQ, the wireless backhaul base station will measure the RSRP or the RSRQ of each of the designated donor base stations, and the obtained measurement result includes a measurement value of RSRP or a measurement value of RSRQ of each of the designated donor base stations.

In an embodiment of the present disclosure, when the measurement quantity of designated measurement includes a load size, the wireless backhaul base station may perform measurement on a load size of each of the designated donor base stations, and the obtained measurement result includes the measurement value of load of each of the designated donor base stations.

In an embodiment of the present disclosure, when the measurement quantity of designated measurement includes the RSRP or the RSRQ, and the load size, the wireless backhaul base station may perform measurement on the RSRP or RSRQ and the load size of each of the designated donor base stations, and the obtained measurement result includes a measurement value of RSRP or a measurement value of RSRQ of each of the designated donor base stations, and a measurement value load of each of the designated donor base stations.

In step 330, measurement report information from the wireless backhaul base station is received, wherein the measurement report information includes the measurement result.

In step 340, a second number of donor base stations that are capable of providing wireless backhaul service to the wireless backhaul base station are determined according to the measurement result.

In an embodiment, when the measurement result includes a measurement value of RSRP or a measurement value of RSRQ of each of the designated donor base stations; when step 340 is performed, the second number of the donor base stations that are capable of providing wireless backhaul service to the wireless backhaul base station can be determined according to the measurement value of RSRP or the measurement value of RSRQ of each of the designated donor base stations. The second number of donor base stations that are capable of providing wireless backhaul service for the wireless backhaul base station can be determined through, but not limited to, the following manner:

From the measurement value of RSRP or the measurement value of RSRQ of each of the designated donor base stations, the designated donor base stations whose measurement value of RSRP or measurement value of RSRQ is greater than a first preset threshold is selected, and the total number of the selected designated donor base stations is determined as the second number.

In an embodiment of the present disclosure, if the measurement result includes a measurement value of load of each of the designated donor base stations, when step 340 is performed, the second number of donor base stations that are capable of providing wireless backhaul service to the wireless backhaul base station may be determined according to the measurement result of load of each of the designated donor base stations. The second number of donor base stations that are capable of providing wireless backhaul service for the wireless backhaul base station can be determined through, but not limited to, the following manner:

Designated donor base stations whose measurement value of load are less than a second preset threshold are selected from the measurement value of load of each of the designated donor base stations, and the total number of the selected designated donor base stations is determined as the second number.

In an embodiment of the present disclosure, when the measurement result includes the measurement value of the RSRP or RSRQ of each of the designated donor base stations, and when the step 340 is performed, the second number of the donor base stations that are capable of providing wireless backhaul service to the wireless backhaul base station may be determined according to the measurement value of the RSRP or RSRQ of each of the designated donor base stations and the measurement result of load of each of the designated donor base stations. The second number of donor base stations that are capable of providing wireless backhaul service for the wireless backhaul base station may be determined through, but not limited to, the following manner:

designated donor base stations whose measurement value of RSRP or measurement value of RSRQ are greater than the first preset threshold and the measurement value of load are less than the second preset threshold are selected, and determine the total number of selected designated donor base stations as the second number.

It can be seen from the above embodiment that, the accuracy of determining the second number can be improved through configuring the measurement parameter to measure each of the designated donor base stations and sending, to the wireless backhaul base station, the measurement parameter, receiving from the wireless backhaul base station the measurement report information which includes the measurement result of each of the designated donor base stations by the wireless backhaul base station according to the measurement parameter, and determining the second number of the donor base stations that are capable of providing wireless backhaul service to the wireless backhaul base station according to the measurement result.

Figure 4:
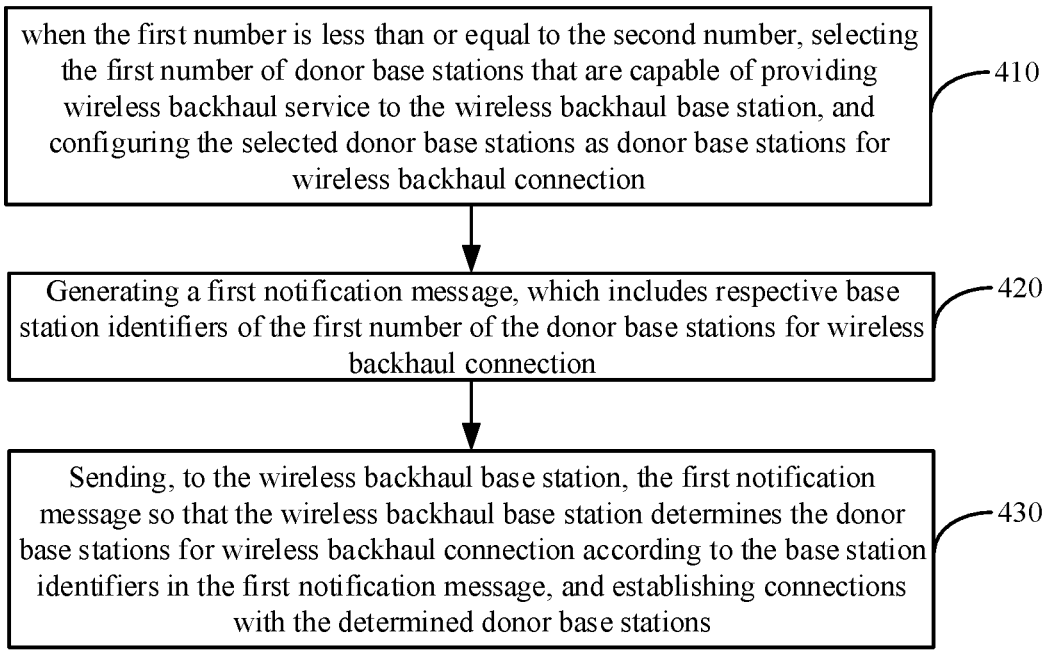
FIG. 4 is a flow chart illustrating another method of wireless backhaul connection according to an exemplary embodiment.

FIG. 4 is a flow chart illustrating another method of wireless backhaul connection according to an exemplary embodiment. The method of wireless backhaul connection may be applicable to an LTE base station, and a wireless backhaul base station and one or more donor base stations are located in a coverage area of the LTE base station. Both the wireless backhaul base station and the donor base stations may be NR small cells; this method is based on the method illustrated in FIG. 1, and as illustrated in FIG. 4, when step 130 is performed, the method includes the following steps 410-430:

In step 410, when the first number is less than or equal to the second number, the first number of donor base stations that are capable of providing wireless backhaul service to the wireless backhaul base station are selected, and the selected donor base stations are configured as donor base stations for wireless backhaul connection.

In step 420, a first notification message, which includes respective base station identifiers of the first number of the donor base stations for wireless backhaul connection, is generated.

In the embodiment of the present disclosure, after the LTE base station configures, for the wireless backhaul base station, the donor base station for wireless backhaul connection, it needs to inform the wireless backhaul base station of which donor base stations it configures, and then the wireless backhaul base station is informed of which donor base stations are configured through the first notification message.

In step 430, the first notification message is sent to the wireless backhaul base station, so that the wireless backhaul base station determines the donor base stations for wireless backhaul connection according to the base station identifiers in the first notification message, and establish connections with the determined donor base stations.

It can be seen from the above embodiment that the requirement of the wireless backhaul base station on the number of connections is satisfied through generating the first notification message which includes respective base station identifiers of the first number of the donor base stations for wireless backhaul connection, sending the first notification message to the wireless backhaul base station, and the wireless backhaul base station determining the donor base stations for wireless backhaul base station and establishing connections with the determined donor base stations, and further, the reliability of wireless backhaul base station to achieve redundant connections is improved.

Figure 5:
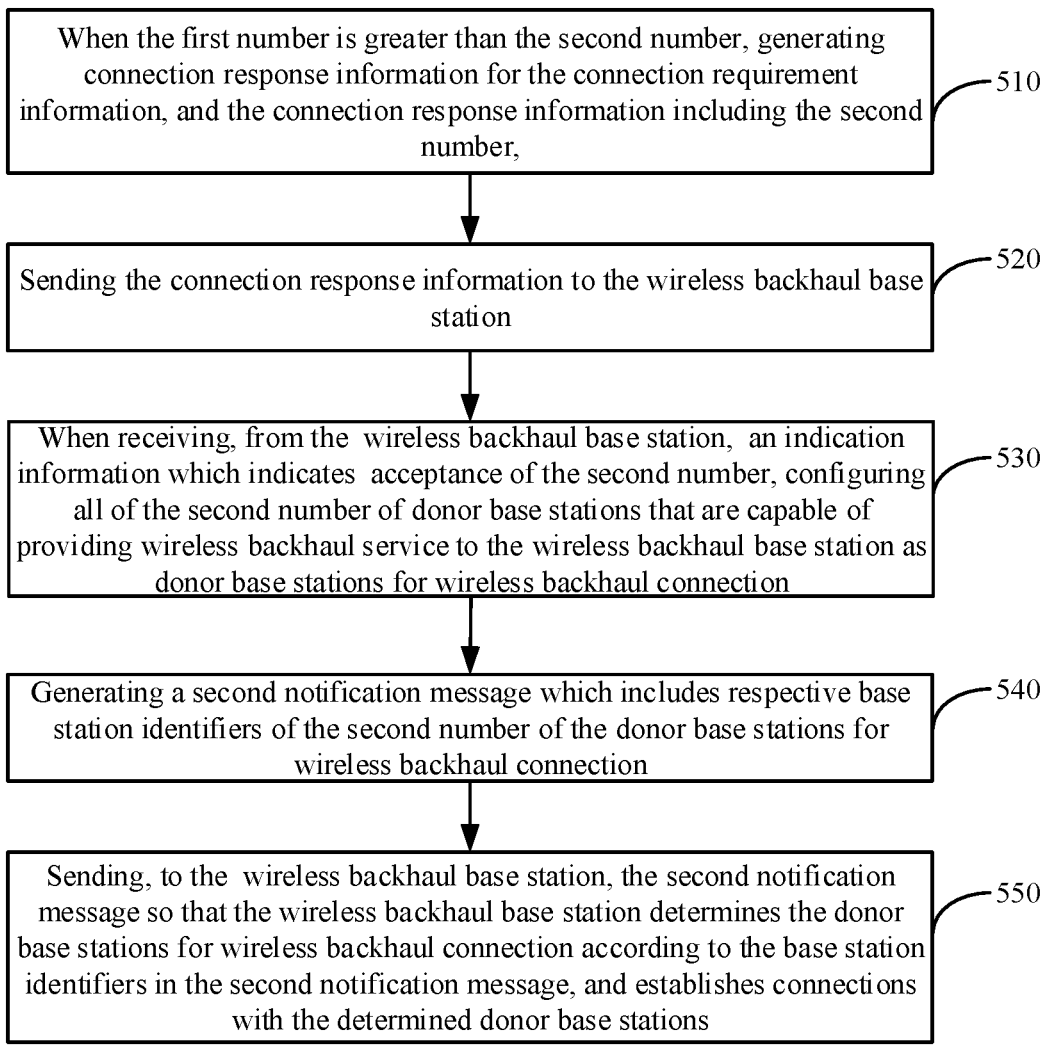
FIG. 5 is a flow chart illustrating another method of wireless backhaul connection according to an exemplary embodiment.

FIG. 5 is a flowchart illustrating another method of wireless backhaul connection according to an exemplary embodiment. The method of wireless backhaul connection is applicable to an LTE base station. A wireless backhaul base station and one or more donor base stations are located in a coverage area of the LTE base station. Both the wireless backhaul base station and the donor base stations may be NR small cells. The method is based on the method illustrated in FIG. 1, and the connection requirement information includes the expected number of connections configured by the wireless backhaul base station, and the LTE base station may determine the expected number of connections as the first number. As illustrated in FIG. 5, when step 120 is performed, the following steps 510-550 may be included:

In step 510, connection response information, which includes the second number, is generated for the connection requirement information when the first number is greater than the second number.

In the embodiment of the present disclosure, the first number is the expected number of connections configured by the wireless backhaul base station.

When the first number is greater than the second number, it means that the number of donor base stations that are capable of providing wireless backhaul service to the wireless backhaul base station is less than the number of donor base stations that the wireless backhaul base station requires to connect to, that is to say, the LTE base station cannot satisfy the connection requirement of the wireless backhaul base station.

Since the first number is the expected number of connections configured by the wireless backhaul base station, the purpose of the LTE base station to generate connection response information is to inform the wireless backhaul base station of the second number through the connection response information, and the wireless backhaul base station may accept or refuse the second number.

In step 520, the connection response information is sent to the wireless backhaul base station.

In step 530, when receiving, from the wireless backhaul base station, indication information which indicates acceptance of all of the second number of donor base stations that are capable of providing wireless backhaul service to the wireless backhaul base station are configured as donor base stations for wireless backhaul connection.

In the embodiment of the present disclosure, the indication information is to indicate that the wireless backhaul base station accepts the second number, and the LTE base station can configure, for the wireless backhaul base station, only the second number of donor base stations for wireless backhaul connection.

In step 540, a second notification message, which includes respective base station identifiers of the second number of the donor base stations for wireless backhaul connection, is generated.

In the embodiment of the present disclosure, after the LTE base station configures, for the wireless backhaul base station, the second number of donor base stations for wireless backhaul connection, it needs to inform the wireless backhaul base station of which donor base stations are configured for it. And then, the wireless backhaul base station is informed of which donor base stations are configured for it through the second notification message.

In step 550, the second notification message is sent to the wireless backhaul base station, so that the wireless backhaul base station determines the donor base stations for wireless backhaul connection according to the base station identifiers in the second notification message, and establishes connections with the determined donor base stations.

It can be seen from the above embodiment that, when the first number is the expected number of connections configured by the wireless backhaul base station, and the first number is greater than the second number, it means that there are fewer donor base stations that are capable of providing wireless backhaul service to the wireless backhaul base station than the donor base stations that the wireless backhaul base station requires to connect to, but the LTE base station cannot refuse to configure donor base stations for the wireless backhaul base station. Instead, the LTE base station informs the wireless backhaul base station of current configuration capability. When the wireless backhaul base station accepts the current configuration capability, a second notification message, which includes the respective base station identifiers of the second number of donor base stations for wireless backhaul connection, is generated, and the second notification message is sent to the wireless backhaul base station, so that the wireless backhaul base station can determine the donor base stations for wireless backhaul connection according to the base station identifiers in the second notification message, and establish connections with the determined donor base stations, thereby enriching the service style of the wireless backhaul connection and improving the practicability of the wireless backhaul connection.

Figure 6:
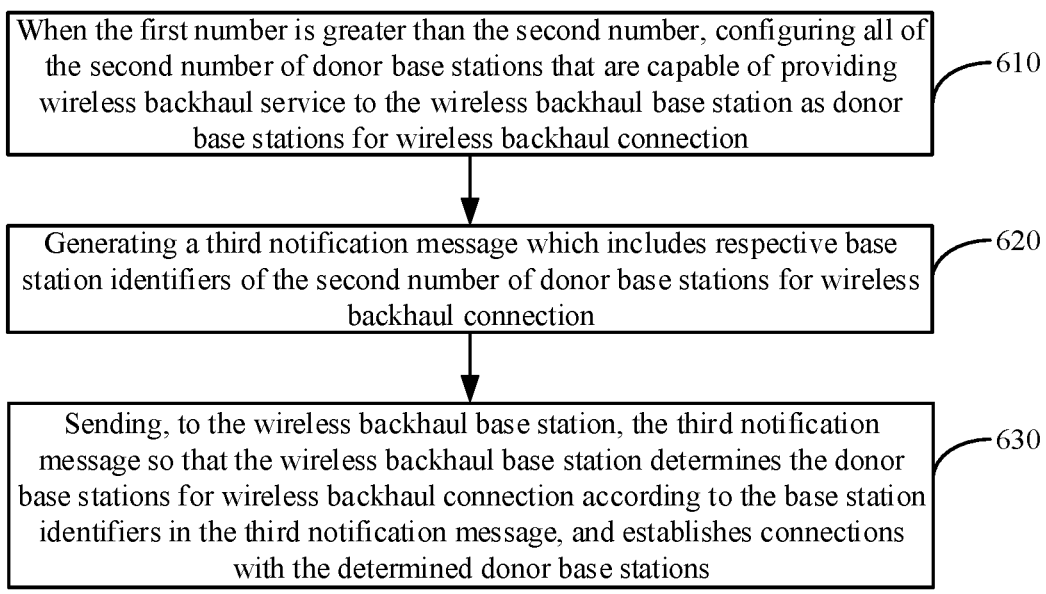
FIG. 6 is a flow chart illustrating another method of wireless backhaul connection according to an exemplary embodiment.

FIG. 6 is a flowchart illustrating another method of wireless backhaul connection according to an exemplary embodiment. The method of wireless backhaul connection is applicable to an LTE base station, and a wireless backhaul base station and one or more donor base stations are located in a coverage area of the LTE base station. The wireless backhaul base station and the donor base stations may both be NR small cells; this method is based on the method illustrated in FIG. 1, and the connection requirement information includes an expected service type and/or an expected quality of service configured by the wireless backhaul base station, and the LTE base station may determine the first number according to the expected service type and/or the expected quality of service. As illustrated in FIG. 6, when step 120 is performed, the following steps 610-630 may be included:

In step 610, when the first number is greater than the second number, all of the second number of donor base stations that are capable of providing wireless backhaul service to the wireless backhaul base station are configured as donor base stations for wireless backhaul connection.

In the embodiment of the present disclosure, as the first number is determined by the LTE base station according to the expected service type and/or the expected quality of service configured by the wireless backhaul base station, when the first number is greater than the second number, it means that there are only the second number of the donor base stations that can be configured, and then the LTE base station can determine to configure, for the wireless backhaul base station, only the second number of the donor base stations for wireless backhaul connection.

In step 620, a third notification message, which includes respective base station identifiers of the second number of donor base stations for wireless backhaul connection, is generated.

In the embodiment of the present disclosure, after the LTE base station configures, for the wireless backhaul base station, the second number of donor base stations for wireless backhaul connection, it needs to inform the wireless backhaul base station of which donor base stations are configured for it. And then, the wireless backhaul base station is informed of which donor base stations are configured for it through the third notification message.

In step 630, the third notification message is sent to the wireless backhaul base station, so that the wireless backhaul base station determines the donor base stations for wireless backhaul connection according to the base station identifiers in the third notification message, and establishes connections with the determined donor base stations.

It can be seen from the above embodiment that, when the first number is determined by the LTE base station according to the expected service type and/or the expected quality of service configured by the wireless backhaul base station, and when the first number is greater than the second number, it means that the number of the donor base stations that are capable of providing wireless backhaul service to the wireless backhaul base station is less than the number of donor base stations that are required to connect to, as predetermined by the LTE base station. At this time, the second number can be determined as the number of donor base stations that needs to be finally connected to, and a third notification message, which includes respective base station identifiers of the second number of the donor base stations for wireless backhaul connection, is generated, and the third notification message is sent to the wireless backhaul base station, so that the wireless backhaul base station can determine the donor base stations for wireless backhaul connection according to the base station identifiers in the third notification message and establish connections with the determined donor base stations. Thereby the requirement of the wireless backhaul base station to achieve redundant connections can be satisfied to the greatest extent, and the quality of service of the wireless backhaul connection is improved.

Figure 7:
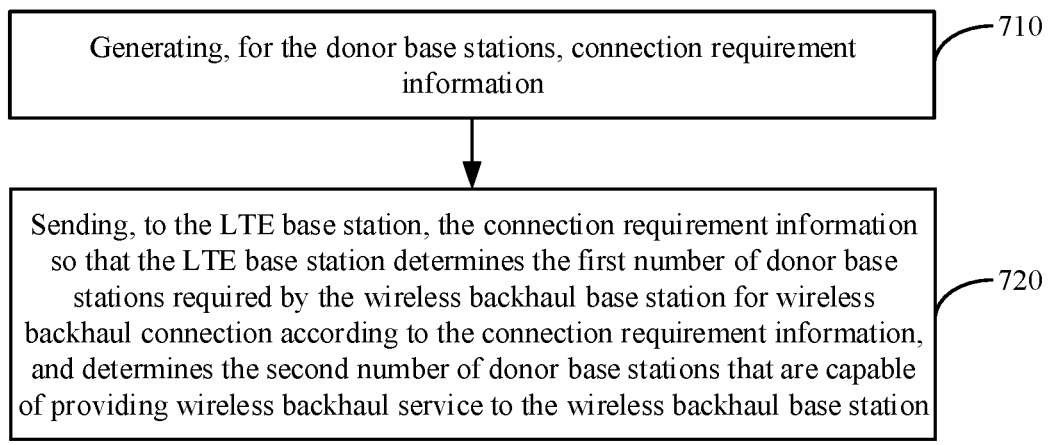
FIG. 7 is a flowchart illustrating a method of wireless backhaul connection according to an exemplary embodiment.

FIG. 7 is a flow chart illustrating a method of wireless backhaul connection according to an exemplary embodiment. The method of wireless backhaul connection is applicable to a wireless backhaul base station. A wireless backhaul base station and one or more donor base stations are located in a coverage area of the LTE base station, and both the wireless backhaul base station and the donor base station are NR small cells. As illustrated in FIG. 7, the method of wireless backhaul connection includes the following steps 710-720:

In step 710, connection requirement information for donor base stations is generated.

In the embodiments of the present disclosure, the LTE base station may be a macro base station with a wide coverage area, and the wireless backhaul base station can transmit data to the core network equipment only through the LTE base station or a donor base station configured by the LTE base station for the wireless backhaul base station.

When the wireless backhaul base station requires to connect to a donor base station, it may inform the LTE base station of its connection requirement information, so that the LTE base station determines a first number of donor base stations required by the wireless backhaul base station for wireless backhaul connection according to the connection requirement information of the wireless backhaul base station.

In an embodiment, the connection requirement information from the wireless backhaul base station may include the expected number of connections configured by the wireless backhaul base station. For example, the expected number of connections is 3.

In an embodiment, the connection requirement information from the wireless backhaul base station may include an expected service type and/or an expected quality of service configured by the wireless backhaul base station. Among them, the service type may refer to various services such as Internet service and video service, and the quality of service may refer to performance index corresponding to various services such as the Internet service and the video service. Moreover, the performance index may refer to a data packet delay, a packet loss rate, and so on.

In step 720, the connection requirement information is sent to the LTE base station, so that the LTE base station determines the first number of donor base stations required by the wireless backhaul base station for wireless backhaul connection according to the connection requirement information, and determines the second number of donor base stations that are capable of providing wireless backhaul service to the wireless backhaul base station.

It can be seen from the above embodiment that, through generating connection requirement information for donor base stations, sending the connection requirement information to the LTE base station, and configuring, by the LTE base station, the donor base stations for wireless backhaul connection according to the connection requirement information, the wireless backhaul base station can access multiple donor base stations at the same time, thereby realizing redundant connections of the wireless backhaul base station, guaranteeing the service continuity of the wireless backhaul base station, and improving the reliability of the wireless backhaul connection.

Figure 8:
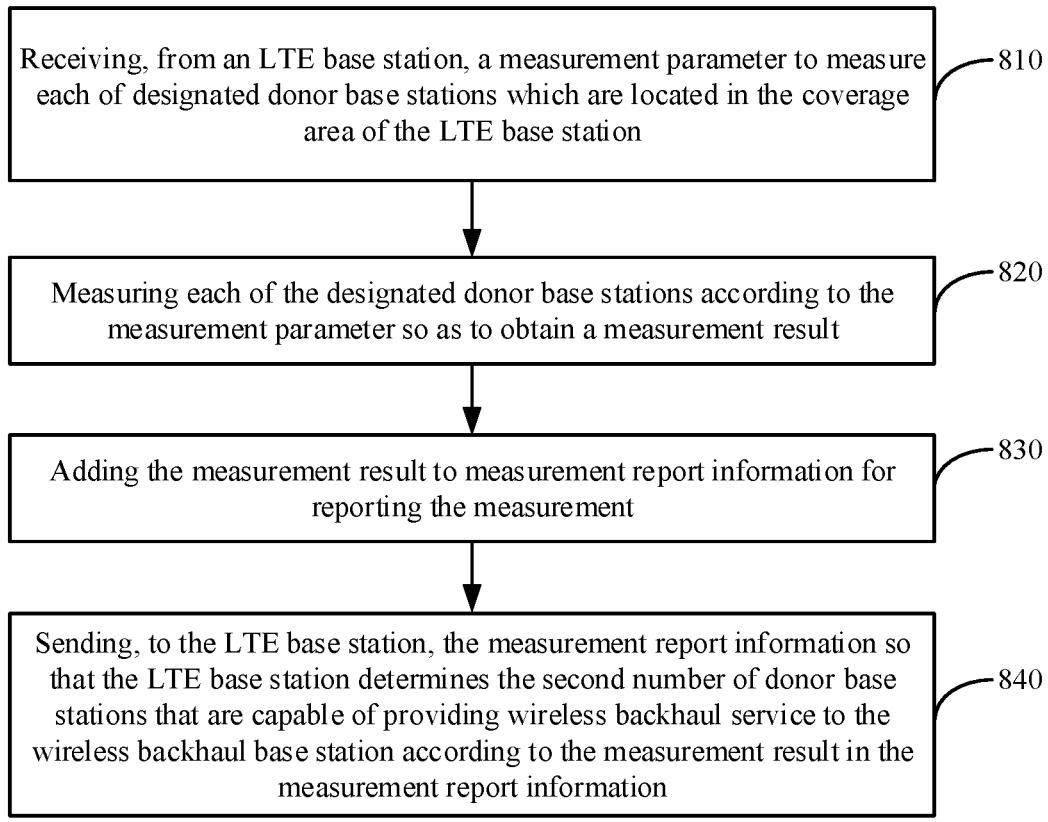
FIG. 8 is a flow chart illustrating another method of wireless backhaul connection according to an exemplary embodiment.

FIG. 8 is a flowchart illustrating another method of wireless backhaul connection according to an exemplary embodiment. The method of wireless backhaul connection is applicable to a wireless backhaul base station. The wireless backhaul base station and one or more donor base stations are located in a coverage area of the LTE base station, both the wireless backhaul base station and the donor base stations may be NR small cells. The method is based on the method illustrated in FIG. 7, and as illustrated in FIG. 8, the wireless backhaul base station further needs to perform measurement according to a measurement parameter configured by the LTE base station and send a measurement result to the LTE base station, so as to determine the second number of donor base stations that are capable of providing wireless backhaul service to the wireless backhaul base station. The method may exemplarily include the following steps 810 to 840.

In step 810, a measurement parameter from an LTE base station is received to measure each of designated donor base stations which are located in the coverage area of the LTE base station.

In the embodiments of the present disclosure, the designated donor base stations may refer to all the donor base stations located in the coverage area of the LTE base station, or a part of all the donor base stations. As for whether it is all or a part, it is determined by the LTE base station on its own according to the actual situation.

In an embodiment of the present disclosure, the measurement parameter in step 810 may include at least one of following parameters:

(4-1) a list of the designated donor base stations which includes each of the designated donor base stations;

(4-2) a measurement quantity of specified measurement (i.e., measurement quantity); and (4-3) a specified trigger condition for measurement.

In an embodiment of the present disclosure, the measurement quantity of specified measurement includes: reference signal received power (RSRP); or reference signal received quality (RSRQ); or a load size; or RSRP and a load size; or RSRQ and a load size.

In an embodiment of the present disclosure, the specified trigger condition for measurement in (4-3) above includes a periodic trigger or an event trigger. Among them, the periodic triggering refers to trigger measurement report at a certain time period, such as: 1 minute; the event trigger designation is to trigger measurement report upon occurrence of a specified event, such as: measurement value of RSRP or measurement value of RSRQ of a donor base station exceeding a set threshold.

In step 820, each of the designated donor base stations is measured according to the measurement parameter so as to obtain a measurement result.

In an embodiment of the present disclosure, when the measurement quantity of designated measurement includes RSRP or RSRQ, the wireless backhaul base station perform measurement on the RSRP or RSRQ of each of the designated donor base stations, and the obtained measurement result includes a measurement value of RSRP of each of the designated donor base stations or a measurement value of RSRQ of each of the designated donor base stations.

In an embodiment of the present disclosure, if the measurement quantity of designated measurement includes a load size, the wireless backhaul base station perform measurement on the load of each of the designated donor base stations, and the obtained measurement result includes a measurement value of the load of each of the designated donor base stations.

In an embodiment of the present disclosure, if the measurement quantity of designated measurement includes the RSRP or the RSRQ, and the load size, the wireless backhaul base station perform measurement on the RSRP or RSRQ, and the load size of each of the designated donor base stations, and the obtained measurement result include a measurement value of RSRP or a measurement value of RSRQ of each of the designated donor base stations, and a measurement value of the load of each of the designated donor base stations.

In step 830, the measurement result is added to measurement report information for reporting the measurement.

In an embodiment of the present disclosure, since the specified trigger condition for measurement may be a periodic trigger or an event trigger, when step 830 is performed, the measurement result may be added to the measurement report information in measurement report triggered by the periodic trigger or the event triggered measurement.

In step 840, the measurement report information is sent to the LTE base station, so that the LTE base station determines the second number of donor base stations that are capable of providing wireless backhaul service to the wireless backhaul base station according to the measurement result in the measurement report information.

It can be seen from the above embodiment that, through receiving, from the LTE base station, the measurement parameter which is to measure each of the designated donor base stations which are all located within the coverage area of the LTE base station, performing measurement on each of the designated donor base stations so as to obtain the measurement result, and adding the measurement result to the measurement report information and sending the measurement report information to the LTE base station for reporting the measurement, the LTE base station can determine the second number of the donor base stations that are capable of providing wireless backhaul service to the wireless backhaul base station, thereby improving the accuracy of determining the second number.

Figure 9:
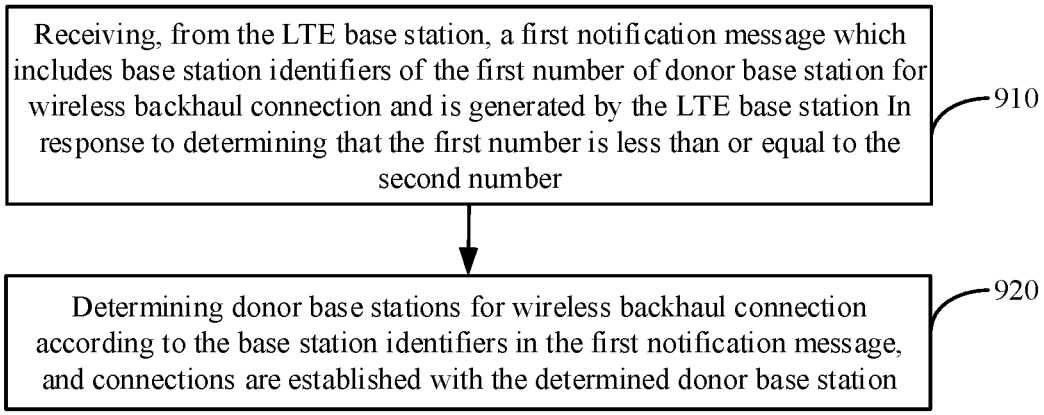
FIG. 9 is a flow chart illustrating another method of wireless backhaul connection according to an exemplary embodiment.

FIG. 9 is a flowchart illustrating another method of wireless backhaul connection according to an exemplary embodiment. The method of wireless backhaul connection is applicable to a wireless backhaul base station. The wireless backhaul base station and one or more donor base stations are located in a coverage area of the LTE base station. Both the wireless backhaul base station and the donor base stations are NR small cells. The method is based on the method illustrated in FIG. 7, and as illustrated in FIG. 8, the method of wireless backhaul connection may further include the following steps 910-920:

In step 910, a first notification message, which includes respective base station identifiers of the first number of donor base station for wireless backhaul connection, is received from the LTE base station is received, wherein the first notification message is generated by the LTE base station in response to determining that the first number is less than or equal to the second number.

In the embodiments of the present disclosure, when the first number is less than or equal to the second number, it means that there are donor base stations that are capable of providing wireless backhaul service to the wireless backhaul base station more than the donor base stations that the wireless backhaul base station requires to connect to, that is to say, the LTE base station can meet the connection requirements of the wireless backhaul base station, and inform the wireless backhaul base station of which donor base stations are configured for it through the first notification message.

In step 920, donor base stations for wireless backhaul connection are determined according to the base station identifiers in the first notification message, and connections are established with the determined donor base station.

It can be seen from the above embodiment that, through receiving the first notification message from the LTE base station, wherein the first notification message includes respective base station identifiers of the first number of the donor base stations for wireless backhaul connection, and the first notification message is generated by the LTE base station in response to determining that the first number is less than or equal to the second number, determining donor base stations for wireless backhaul connection according to the base station identifiers in the first notification message, and establishing connections with the determined donor base stations, the requirement of the wireless backhaul base station on the number of connections is satisfied, and further, the reliability of the wireless backhaul base station to achieve redundant connections is improved.

Figure 10:
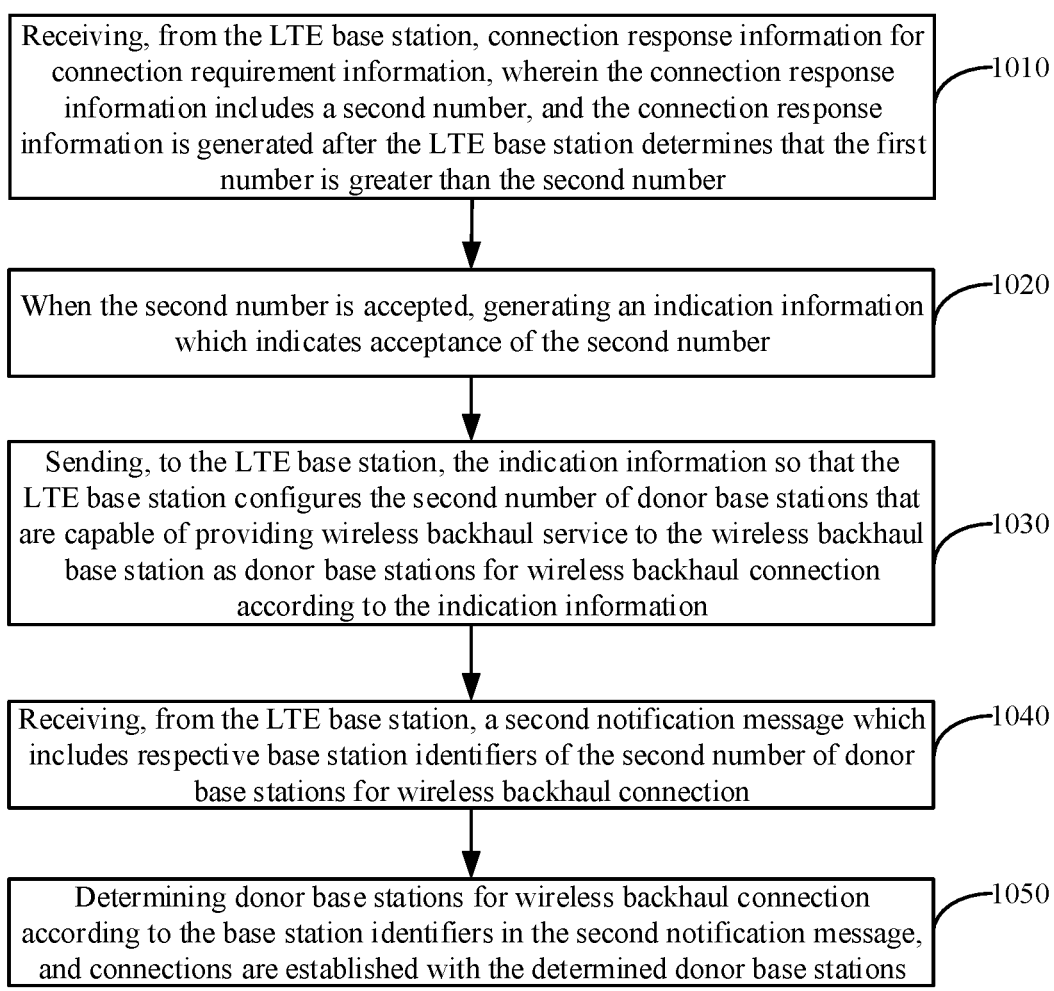
FIG. 10 is a flow chart illustrating another method of wireless backhaul connection according to an exemplary embodiment.

FIG. 10 is a flow chart illustrating another method of wireless backhaul connection according to an exemplary embodiment. The method of wireless backhaul connection is applicable to a wireless backhaul base station, and the wireless backhaul base station and one or more donor base stations are located in a coverage area of an LTE base station, both the wireless backhaul base station and the donor base stations are NR small cells. The method is based on the method illustrated in FIG. 7, and the connection requirement information includes an expected number of connections configured by the wireless backhaul base station, and the LTE base station may determine the desired number of connections as the first number. As illustrated in FIG. 10, the method of wireless backhaul connection may further include the following steps 1010 to 1050.

In step 1010, connection response information for connection requirement information is received from the LTE base station, wherein the connection response information includes a second number, and the connection response information is generated by the LTE base station in response to determining that the first number is greater than the second number.

In the embodiment of the present disclosure, when the first number is greater than the second number, it means that the donor base stations that are capable of providing wireless backhaul service to the wireless backhaul base station is less than the donor base stations that the wireless backhaul base station requires to connect to, that is, the LTE base station cannot meet the connection requirement of the wireless backhaul base station.

Since the first number is the expected number of connections configured by the wireless backhaul base station, the wireless backhaul base station can receive the second number informed by the LTE base station through the connection response information. At this time, the wireless backhaul base station may accept or refuse the second number.

In step 1020, when the second number is accepted, an indication information for indicating acceptance of the second number is generated.

In step 1030, the indication information is sent to the LTE base station, so that the LTE base station configures the second number of donor base stations that are capable of providing wireless backhaul service to the wireless backhaul base station as donor base stations for wireless backhaul connection according to the indication information.

In step 1040, a second notification message from the LTE base station is received, wherein the second notification message includes base station identifiers of the second number of donor base stations for wireless backhaul connection.

In the embodiment of the present disclosure, the second notification message is intended to indicate which donor base stations are configured by the LTE base station.

In step 1050, donor base stations for wireless backhaul connection are determined according to the base station identifiers in the second notification message, and connections are established with the determined donor base stations.

It can be seen from the above embodiment that, when the first number is the expected number of connections configured by the wireless backhaul base station, and the first number is greater than the second number, it means that there are less donor base stations that are capable of providing wireless backhaul service to the wireless backhaul base station than the donor base stations that the wireless backhaul base station requires connect to. The wireless backhaul base station can choose to accept or refuse the configuration of the LTE base station. If accepting, the wireless backhaul base station can receive a second notification message from the LTE base station, wherein the second notification message includes the base station identifiers of the second number of the donor base stations for wireless backhaul connection, and connections are established with the determined donor base stations, thereby enriching service styles of the wireless backhaul connection and further improving the practicality of the wireless backhaul connections.

Figure 11:
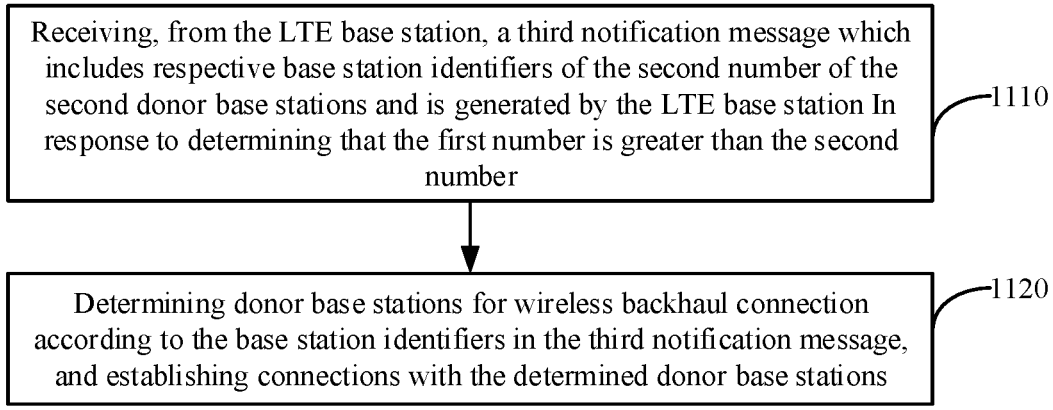
FIG. 11 is a flow chart illustrating another method of wireless backhaul connection according to an exemplary embodiment.

FIG. 11 is a flow chart illustrating another method of wireless backhaul connection according to an exemplary embodiment. The method of wireless backhaul connection is applicable to a wireless backhaul base station. The wireless backhaul base station and donor base stations are located in a coverage area of the LTE base station, and both the wireless backhaul base station and the donor base stations are NR small cells. This method is based on the method illustrated in FIG. 7, and the connection requirement information includes an expected service type and/or an expected quality of service configured by the wireless backhaul base station, the LTE base station may determine the first number according to the expected service type and/or the expected quality of service; as illustrated in FIG. 11, the method of wireless backhaul connection may further include the following steps 1110-1120:

In step 1110, a third notification message from the LTE base station is received, wherein the third notification message includes respective base station identifiers of the second number of the donor base stations, and the third notification message is generated by the LTE base station in response to determining that the first number is greater than the second number.

In the embodiment of the present disclosure, when the first number is greater than the second number, it means that the donor base stations that are capable of providing wireless backhaul service to the wireless backhaul base station is less than the donor base stations that the wireless backhaul base station requires to connect to, that is, the LTE base station cannot satisfy the requirement of the wireless backhaul base station.

The first number is determined by the LTE base station according to the expected service type and/or the expected quality of service, and the LTE base station may ultimately determine that the number of donor base stations that are configured for the wireless backhaul base station is the second number.

In step 1120, donor base stations for wireless backhaul connection are determined according to the base station identifiers in the third notification message, and connections are established with the determined donor base stations.

It can be seen from the above embodiment that, the requirement of the wireless backhaul base station on redundant connections is satisfied to the greatest extent through receiving the third notification message from the LTE base station, wherein the third notification message includes the respective base station identifiers of the second number of the donor base stations, and the third notification message is generated by the LTE base station in response to determining that the first number is greater than the second number, determining donor base stations for wireless backhaul connection according to the base station identifiers in the third notification message, and establishing connections with the determined donor base stations, thereby improving the quality of service of wireless backhaul connection.

Corresponding to the embodiments of the method of wireless backhaul connection as described above, the present disclosure further provides an embodiment of a device of wireless backhaul connection.

Figure 12:
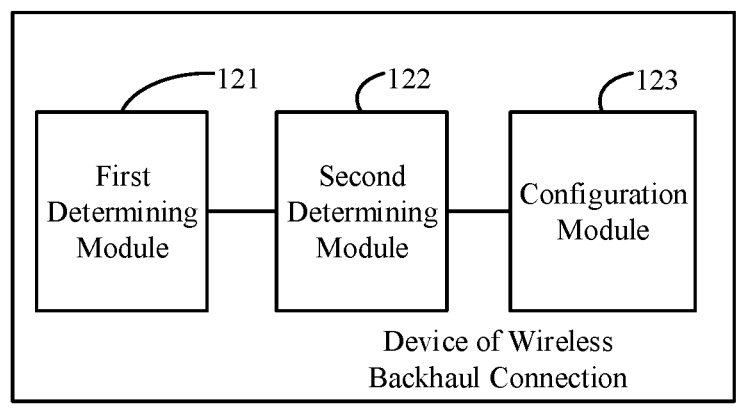
FIG. 12 is a block diagram illustrating a device of wireless backhaul connection according to an exemplary embodiment.

FIG. 12 is a block diagram illustrating a device of wireless backhaul connection according to an exemplary embodiment. The device is applicable to an LTE base station. A wireless backhaul base station and donor base stations are located in a coverage area of the LTE base station. Both the base station and the donor base stations may be NR small cells; and the device of wireless backhaul connection is configured to implement the method of wireless backhaul connection illustrated in FIG. 1. As illustrated in FIG. 12, the device of wireless backhaul connection may include:

a first determining module 121, configured to, when receiving connection requirement information for donor base stations from the wireless backhaul base station, determine a first number of donor base stations required by the wireless backhaul base station for wireless backhaul connection according to the connection requirement information;

a second determining module 122, configured to determine a second number of donor base stations that are capable of providing wireless backhaul service to the wireless backhaul base station; and a configuration module 123, configured to configure, for the wireless backhaul base station, donor base stations for wireless backhaul connection according to the first number and the second number.

It can be seen from the above embodiment that, when receiving, from the wireless backhaul base station, the connection requirement information for donor base stations, the first number of donor base stations required by the wireless backhaul base station for wireless backhaul connection can be determined according to the connection requirement information, and the second number of the donor base stations that are capable of providing wireless backhaul service to the wireless backhaul base station is determined. When the first number is less than or equal to the second number, donor base stations for wireless backhaul connection are configured for the wireless backhaul base station according to the first number and the second number. In this way, the wireless backhaul base station can access multiple donor base stations at the same time, thereby realizing the redundant connections of the wireless backhaul base station, guaranteeing the continuity of the wireless backhaul base station business, and improving the reliability of the wireless backhaul connection.

Figure 13:
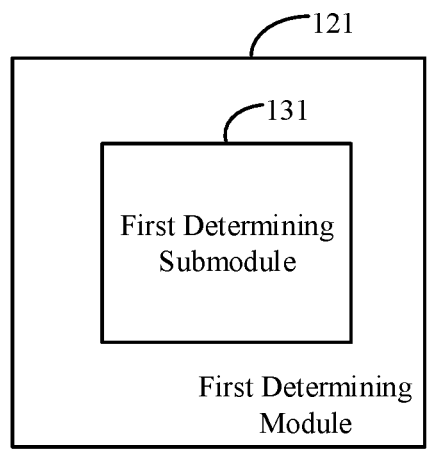
FIG. 13 is a block diagram illustrating another device of wireless backhaul connection according to an exemplary embodiment.

In an embodiment of the present disclosure, based on the device illustrated in FIG. 12, the connection requirement information includes an expected number of connections configured by the wireless backhaul base station. As illustrated in FIG. 13, the first determining module 121 may include:

a first determining submodule 131, configured to determine the expected number of connections as the first number.

Figure 14:
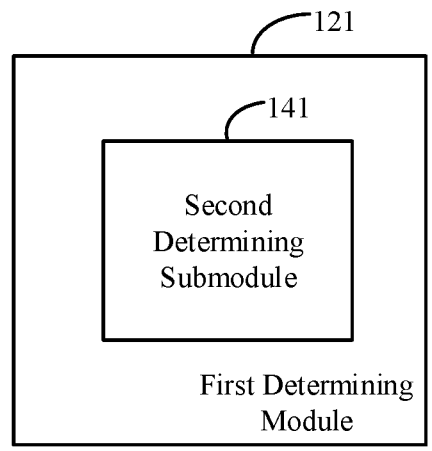
FIG. 14 is a block diagram illustrating another device of wireless backhaul connection according to an exemplary embodiment.

In an embodiment of the present disclosure, based on the device illustrated in FIG. 12, the connection requirement information includes an expected service type and/or an expected quality of service configured by the wireless backhaul base station. And as illustrated in FIG. 14, the first determination module 121 may include:

a second determining submodule 141, configured to determine the first number according to the expected service type and/or the expected quality of service.

Figure 15:
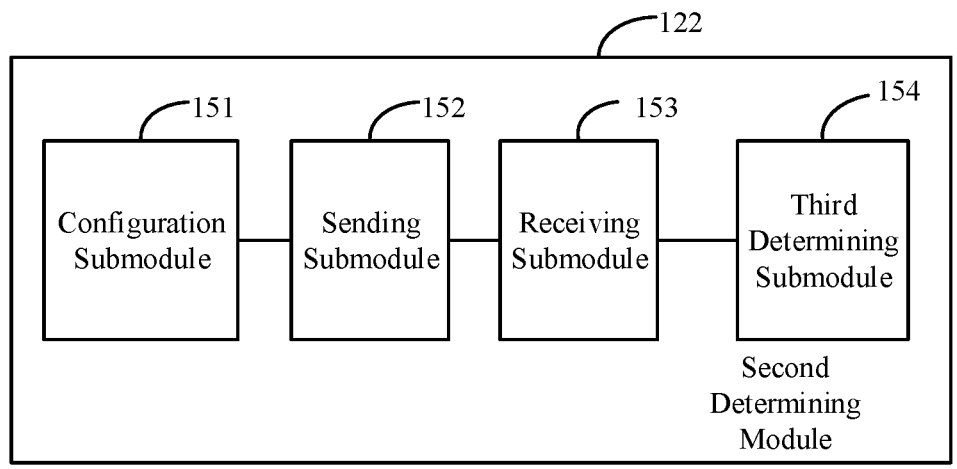
FIG. 15 is a block diagram illustrating another device of wireless backhaul connection according to an exemplary embodiment.

In an embodiment of the present disclosure, based on the device illustrated in FIG. 12, as illustrated in FIG. 15, the second determining module 122 may include:

a configuration submodule 151, configured to configure a measurement parameter to measure each of designated donor base stations, where each of the designated donor base stations is located within the coverage area of the LTE base station;

a sending submodule 152, configured to send the measurement parameter to the wireless backhaul base station, so that the wireless backhaul base station perform measurement on each of the designated donor base stations according to the measurement parameter so as to obtain a measurement result;

a receiving submodule 153, configured to receive, from the wireless backhaul base station, measurement report information which includes the measurement result;

a third determining submodule 154, configured to determine, according to the measurement result, a second number of donor base stations that are capable of providing wireless backhaul service to the wireless backhaul base station.

It can be seen from the above embodiment that, when the connection requirement information for donor base stations from the wireless backhaul base station is received, the first number of donor base stations required by the wireless backhaul base station for wireless backhaul connection can be determined according to the connection requirement information, and the second number of donor base stations that are capable of providing wireless backhaul service to the wireless backhaul base station is determined, when the first number is less than or equal to the second number, the first number of donor base stations that are capable of providing wireless backhaul service to the wireless backhaul base station base station are selected, and the selected donor base stations are configured as donor base stations for wireless backhaul connection, so that the wireless backhaul base station can access multiple donor base stations at the same time, thereby realizing the redundant connections of the wireless backhaul base station and guaranteeing the service continuity of the wireless backhaul base station, and further improving the reliability of the wireless backhaul connection.

In an embodiment of the present disclosure, based on the device illustrated in FIG. 15, the measurement parameter includes at least one of following parameters:

a list of designated donor base stations which includes each of the designated donor base stations;

a measurement quantity of specified measurement (i.e., measurement quantity); and a specified trigger condition for measurement.

In an embodiment of the present disclosure, the measurement quantity of the specified measurement includes: RSRP; or RSRQ; or a load size; or RSRP and a load size; or RSRQ and a load size.

In an embodiment of the present disclosure, the specified trigger condition for measurement includes a periodic trigger or an event trigger.

Figure 16:
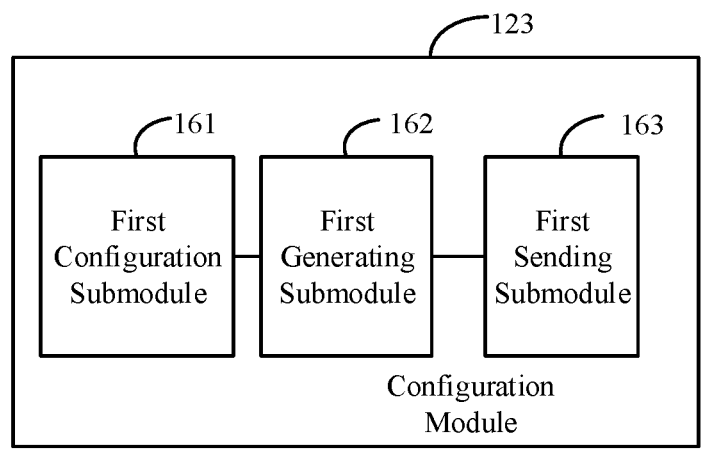
FIG. 16 is a block diagram illustrating another device of wireless backhaul connection according to an exemplary embodiment.

In an embodiment of the present disclosure, based on the device illustrated in FIG. 12, as illustrated in FIG. 16, the configuration module 123 may include:

a first configuration submodule 161, configured to select the first number of donor base stations that are capable of providing wireless backhaul service to the wireless backhaul base station, and configure the selected donor base stations as donor base stations for wireless backhaul connection, when the first number is less than or equal to the second number;

a first generating submodule 162, configured to generate a first notification message which includes respective base station identifiers of the first number of donor base stations for wireless backhaul connection; and a first sending submodule 163, configured to send, to the wireless backhaul base station, the first notification message so that the wireless backhaul base station determines donor base stations for wireless backhaul connection according to the base station identifiers in the first notification message and establish connections with the determined donor base stations.

It can be seen from the above embodiment that, through generating the first notification message which includes respective base station identifiers of the first number of the donor base stations for wireless backhaul connection, and sending the first notification message to the wireless backhaul base station, the wireless backhaul base station can determine the donor base stations for wireless backhaul connection according to the base station identifiers in the first notification message, and establish connections with the determined donor base stations, thereby satisfying requirement of the wireless backhaul base station on the number of connections, and further improving the reliability of the wireless backhaul base station to achieve redundant connections.

Figure 17:
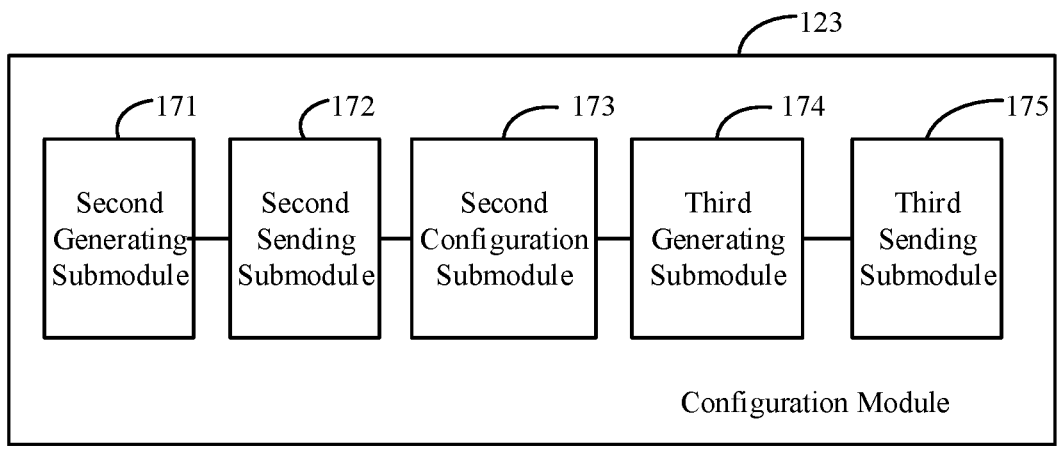
FIG. 17 is a block diagram illustrating another device of wireless backhaul connection according to an exemplary embodiment.

In an embodiment of the present disclosure, based on the device illustrated in FIG. 13, as illustrated in FIG. 17, the configuration module 123 may include:

a second generating submodule 171, configured to generate, when the first number is greater than the second number, connection response information for the connection requirement information, wherein the connection response information includes the second number;

a second sending submodule 172, configured to send the connection response information to the wireless backhaul base station;

a second configuration submodule 173, configured to, when receiving, from the wireless backhaul base station the indication information which indicates acceptance of the second number, configure the second number of the donor base stations that are capable of providing wireless backhaul service to the wireless backhaul base station as donor base stations for wireless backhaul connection;

a third generating submodule 174, configured to generate a second notification message which includes respective base station identifiers of the second number of donor base stations for wireless backhaul connection; and a third sending submodule 175, configured to send, to the wireless backhaul base station, the second notification message so that the wireless backhaul base station determines donor base stations for wireless backhaul connection according to the base station identifiers in the second notification message and establish connections with the determined donor base stations.

It can be seen from the above embodiment that, when the first number is the expected number of connections configured by the wireless backhaul base station, and the first number is greater than the second number, it means that there are less donor base stations that are capable of providing wireless backhaul service to the wireless backhaul base station than the donor base stations required by the wireless backhaul base station for wireless backhaul connection, but it cannot be refused to configure donor base stations for the wireless backhaul base station. Instead, current configuration capability is informed to the wireless backhaul base station. When the wireless backhaul base station accepts the current configuration capability, a second notification message, which includes respective base station identifiers of the second number of the donor base station for wireless backhaul connection, is generated, and is sent to the wireless backhaul base station, so that the wireless backhaul base station can determines donor base stations for wireless backhaul connection according to the base station identifiers in the second notification message, and establishes connections with the determined donor base stations, thereby enriching the service style of the wireless backhaul connection and improving the practicability of the wireless backhaul connection.

Figure 18:
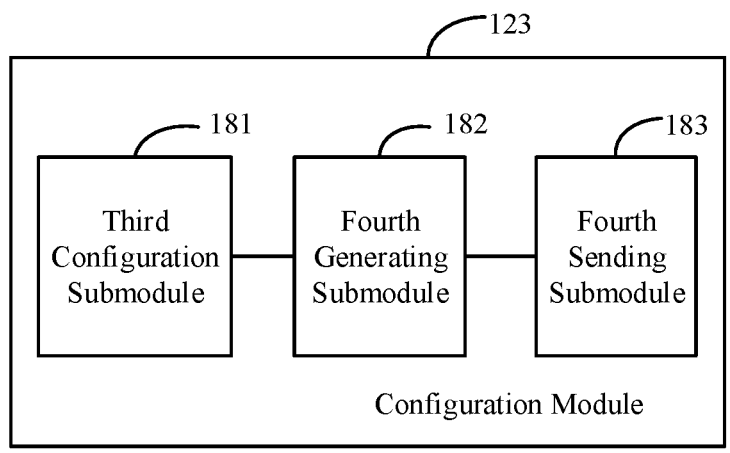
FIG. 18 is a block diagram illustrating another device of wireless backhaul connection according to an exemplary embodiment.

In an embodiment of the present disclosure, based on the device illustrated in FIG. 14, as illustrated in FIG. 18, the configuration module 123 may include:

a third configuration submodule 181, configured to, when the first number is greater than the second number, configure all the second number of donor base stations that are capable of providing wireless backhaul service to the wireless backhaul base station as donor base stations for wireless backhaul connection;

a fourth generating submodule 182, configured to generate a third notification message which includes respective base station identifiers of the second number of donor base stations for wireless backhaul connection; and a fourth sending submodule 183, configured to send, to the wireless backhaul base station, the third notification message so that the wireless backhaul base station determines donor base stations for wireless backhaul connection according to the base station identifiers in the third notification message and establishes connections with the determined donor base station.

It can be seen from the above embodiment that, when the first number is determined by the LTE base station according to the expected service type and/or the expected quality of service configured by the wireless backhaul base station, and the first number is greater than the second number, it means that the donor base stations that are capable of providing wireless backhaul base service to the wireless backhaul base station is less than the donor base stations that is required to be connected to, as predetermined by the LTE base station, then the second number is determined as the number of the donor base stations that are ultimately connected to and the third notification message, which includes respective base station identifiers of the second number of the donor base stations for wireless backhaul connection, is generated, and is sent to the wireless backhaul base station, and thus, the wireless backhaul base station can determine donor base stations for wireless backhaul connection according to the base station identifiers in the third notification message, and establishes connections with the determined donor base stations, thereby satisfying the requirement of the wireless backhaul base station to achieve redundant connections to the greatest extent, and improving the quality of service of the wireless backhaul connection.

Figure 19:
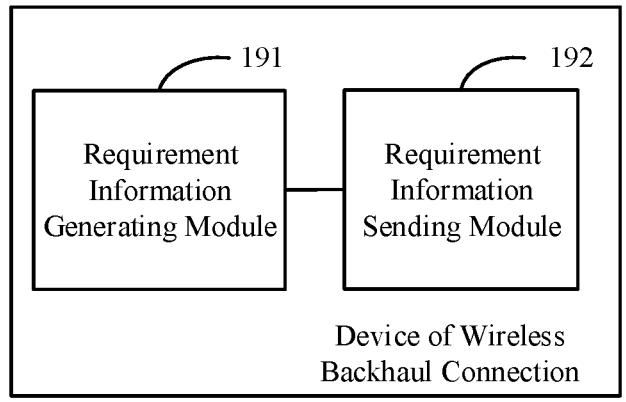
FIG. 19 is a block diagram illustrating a device of wireless backhaul connection according to an exemplary embodiment.

FIG. 19 is a block diagram illustrating a device of wireless backhaul connection according to an exemplary embodiment. The device is applicable to a wireless backhaul base station. The wireless backhaul base station and donor base stations are located in a coverage area of an LTE base station. Both the wireless backhaul base station and the donor base stations are NR small cells. The device of wireless backhaul connection is configured to perform the method of wireless backhaul connection as illustrated in FIG. 7. As illustrated in FIG. 19, the device of wireless backhaul connection may include:

a requirement information generating module 191, configured to generate connection requirement information for donor base stations; and a requirement information sending module 192, configured to send, to the LTE base station, the connection requirement information so that the LTE base station determines a first number of donor base stations required by the wireless backhaul base station for wireless backhaul connection according to the connection requirement information, and determines a second number of donor base stations that are capable of providing wireless backhaul service to the wireless backhaul base station.

It can be seen from the above embodiment that, through generating the connection requirement information for donor base stations and sending the connection requirement information to the LTE base station, the LTE base station can configure the donor base stations for wireless backhaul connection according to the connection requirement information, so that the wireless backhaul base station can access multiple donor base stations at the same time, thereby realizing the redundant connections of the wireless backhaul base station, guaranteeing the service continuity of the wireless backhaul base station, and further improving the reliability of wireless backhaul connection.

In an embodiment of the present disclosure, based on the device illustrated in FIG. 19, the connection requirement information includes an expected number of connections configured by the wireless backhaul base station.

In an embodiment of the present disclosure, based on the apparatus illustrated in FIG. 19, the connection requirement information includes an expected service type and/or an expected quality of service configured by the wireless backhaul base station.

Figure 20:
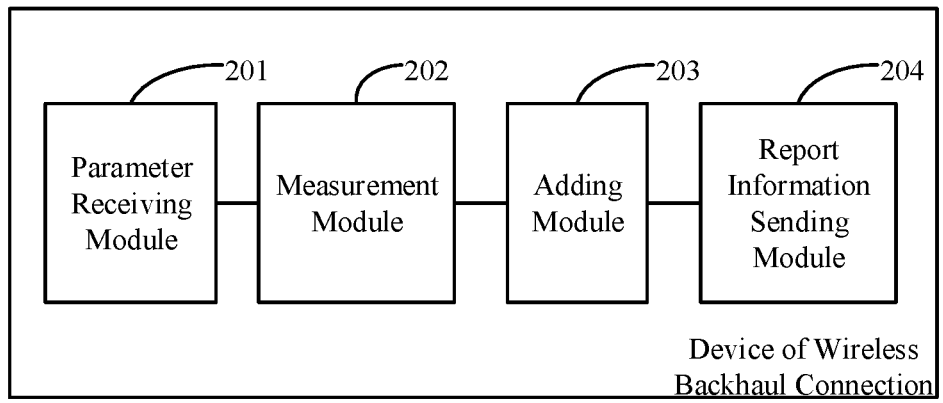
FIG. 20 is a block diagram illustrating another device of wireless backhaul connection according to an exemplary embodiment.

In an embodiment of the present disclosure, based on the device illustrated in FIG. 19, as illustrated in FIG. 20, the wireless backhaul device may further include:

a parameter receiving module 201, configured to receive, from the LTE base station, a measurement parameter to measure each of designated donor base stations which are located in the coverage area of the LTE base station;

a measurement module 202, configured to measure each of the designated donor base stations according to the measurement parameter so as to obtain a measurement result;

an adding module 203, configured to add the measurement result to a measurement report information for reporting the measurement; and a report information sending module 204, configured to send, to the LTE base station, the measurement report information so that the LTE base station determines a second number of donor base stations that are capable of providing wireless backhaul service to the wireless backhaul base station according to the measurement result in the measurement report information.

It can be seen from the above embodiment that, by receiving, from the LTE base station, the measurement parameter to measure each of the designated donor base stations that are located in the coverage area of the LTE base station, performing measurement on each of the designated donor base stations so as to obtain the measurement result, adding the measurement result to the measurement report information for reporting the measurement, and sending the measurement report information to the LTE base station, so that the LTE base station can determine the second number of the donor base stations that are capable of providing wireless backhaul service to the wireless backhaul base station according to the measurement result in the measurement report information, thereby improving the accuracy of determining the second number.

In an embodiment of the present disclosure, based on the device illustrated in FIG. 20, the measurement parameter includes at least one of following parameters:

a list of designated donor base stations which includes each of the designated donor base stations;

a measurement quantity of specified measurement; and a specified trigger condition for measurement.

In an embodiment of the present disclosure, the measurement quantity of specified measurement includes: RSRP; or RSRQ; or a load size; or RSRP and a load size; or RSRQ and a load size.

In an embodiment of the present disclosure, the specified trigger condition for measurement includes a periodic trigger or an event trigger.

Figure 21:
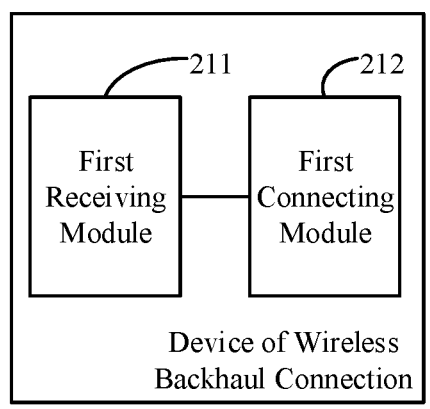
FIG. 21 is a block diagram illustrating another device of wireless backhaul connection according to an exemplary embodiment.

In an embodiment, based on the device illustrated in FIG. 19, as illustrated in FIG. 21, the device of wireless backhaul connection may further include:

a first receiving module 211, configured to receive, from the LTE base station, a first notification message which includes respective base station identifiers of the first number of the donor base stations for wireless backhaul connection, and is generated by the LTE base station in response to determining that the first number is less than or equal to the second number; and a first connecting module 212, configured to determine donor base stations for wireless backhaul connection according to the base station identifiers in the first notification message, and establish connections with the determined donor base stations.

It can be seen from the above embodiment that, through receiving, from the LTE base station, the first notification message which includes respective base station identifiers of the first number of the donor base stations for wireless backhaul connection, and is generated by the LTE base station in response to determining that the first number is less than or equal to the second number, determining the donor base stations for wireless backhaul connection according to the base station identifiers in the first notification message, and establishing connections with the determined donor base stations, thereby satisfying requirement of the wireless backhaul base station on the number of connections and further improving the reliability of the wireless backhaul base station to achieve redundant connections.

Figure 22:
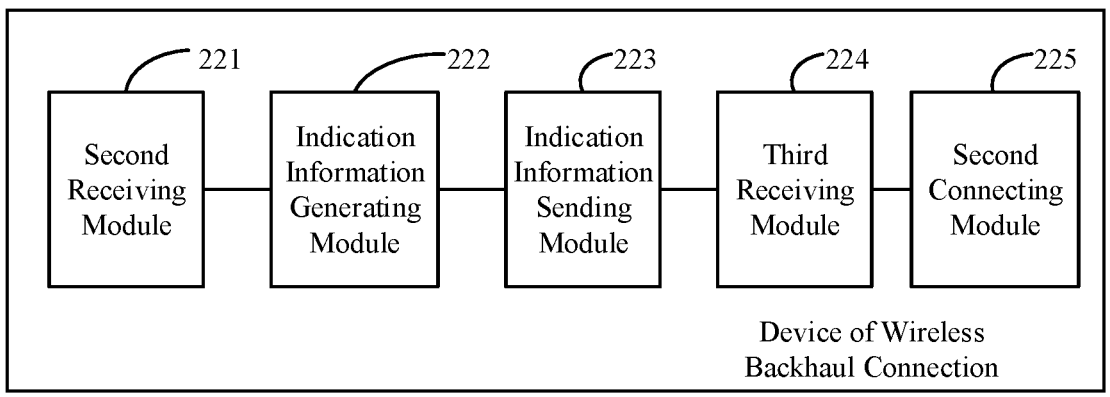
FIG. 22 is a block diagram illustrating another device of wireless backhaul connection according to an exemplary embodiment.

In an embodiment of the present disclosure, based on the device illustrated in FIG. 19, the connection requirement information includes an expected number of connections configured by the wireless backhaul base station. As illustrated in FIG. 22, the device of wireless backhaul connection may further include:

a second receiving module 221, configured to receive, from the LTE base station, connection response information for the connection requirement information wherein the connection response information includes the second number, and is generated by the LTE base station in response to determining that the first number is greater than the second number;

an indication information generating module 222, configured to generate indication information which indicates acceptance of the second number when the second number is accepted;

an indication information sending module 223, configured to send the indication information to the LTE base station, so that the LTE base station configure all of the second number of donor base stations that are capable of providing wireless backhaul service to the wireless backhaul base station as donor base stations for wireless backhaul connection according to the indication information;

a third receiving module 224, configured to receive, from the LTE base station, a second notification message which includes respective base station identifiers of the second number of donor base stations for wireless backhaul connection; and a second connecting module 225, configured to determine donor base stations for wireless backhaul connection according to the base station identifiers in the second notification message, and establish connections with the determined donor base station.

It can be seen from the above embodiment that, when the first number is the expected number of connections configured by the wireless backhaul base station, and the first number is greater than the second number, it means that there are fewer donor base stations that are capable of providing wireless backhaul service to the wireless backhaul base station than the donor base stations required by the wireless backhaul base station for wireless backhaul connection, the wireless backhaul base station may accept or refuse the configuration of the LTE base station. If accepting, the wireless backhaul base station can receive, from the LTE base station, the second notification message which includes the base station identifiers of the second number of the donor base stations for wireless backhaul connection, and determine the donor base stations for wireless backhaul connection according to the base station identifiers in the second notification message, and establish connections with the determined donor base stations. Thereby, the service styles of wireless backhaul connection can be enriched, and the practicality of wireless backhaul connections can be improved.

Figure 23:
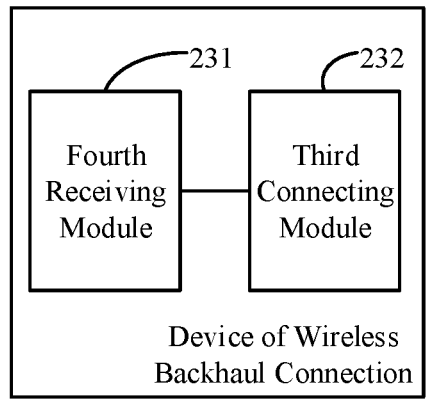
FIG. 23 is a block diagram illustrating another device of wireless backhaul connection according to an exemplary embodiment.

In an embodiment of the present disclosure, based on the device illustrated in FIG. 19, the connection requirement information includes an expected service type and/or an expected quality of service configured by the wireless backhaul base station. As illustrated in FIG. 23, the device of wireless backhaul connection may further include:

a fourth receiving module 231, configured to receive, from the LTE base station, a third notification message which includes respective base station identifiers of the second number of the donor base stations, and is generated by the LTE base station in response to determining that the first number is greater than the second number; and a third connecting module 232, configured to determine donor base stations for wireless backhaul connection according to the base station identifiers in the third notification message, and establish connections with the determined donor base stations.

It can be seen from the above embodiment that, through receiving, from the LTE base station, the third notification message which includes respective base station identifiers of the second number of the donor base stations, and is generated by the LTE base station in response to determining that the first number is greater than the second number, and determines the donor base station for wireless backhaul connection according to the base station identifier in the third notification message, and establishes connections with the determined donor base stations, thus requirement of the wireless backhaul base station to achieving redundant connections can be satisfied to the greatest extent and the quality of service of wireless backhaul connection is improved.

As for the embodiments of the device, since it substantially corresponds to the embodiments of the method, relevant parts can be referred to the description of the part of the method embodiment. The embodiments of the device as described above are merely illustrative. The units that are described as separate components above may or may not be physically separated, and the components that are illustrated as one unit may or may not be a physical unit, that is, they may be located in one place, or may be distributed to multiple network units. Some or all of the modules can be selected to achieve the purpose of the technical solutions of the present disclosure according to actual requirements. One of ordinary skill in the art can understand and implement the present disclosure without creative work.

At least one embodiment of the present disclosure further provides a non-transitory computer-readable storage medium on which a computer program is stored, and the computer program is configured to perform the method of wireless backhaul connection described in any one of FIGS. 1 to 6.

At least one embodiment of the present disclosure further provides a non-transitory computer-readable storage medium on which a computer program is stored, and the computer program is configured to perform the method of wireless backhaul connection described in any one of FIGS. 7 to 11.

At least one embodiment of the present disclosure further provides an apparatus of wireless backhaul connection. The apparatus is applicable to an LTE base station. A wireless backhaul base station and donor base stations are located in a coverage area of the LTE base station. Both the wireless backhaul base station and the donor base stations are NR small cells. The apparatus includes:

a processor;

a memory, configured to store instructions executable by the processor;

wherein, the processor is configured to:

when receiving connection requirement information for donor base stations from the wireless backhaul base station, determine a first number of donor base stations required by the wireless backhaul base station for wireless backhaul connection according to the connection requirement information;

determine a second number of donor base stations that are capable of providing wireless backhaul service to the wireless backhaul base station; and configure, for the wireless backhaul base station, donor base stations for wireless backhaul connection according to the first number and the second number.

Figure 24:
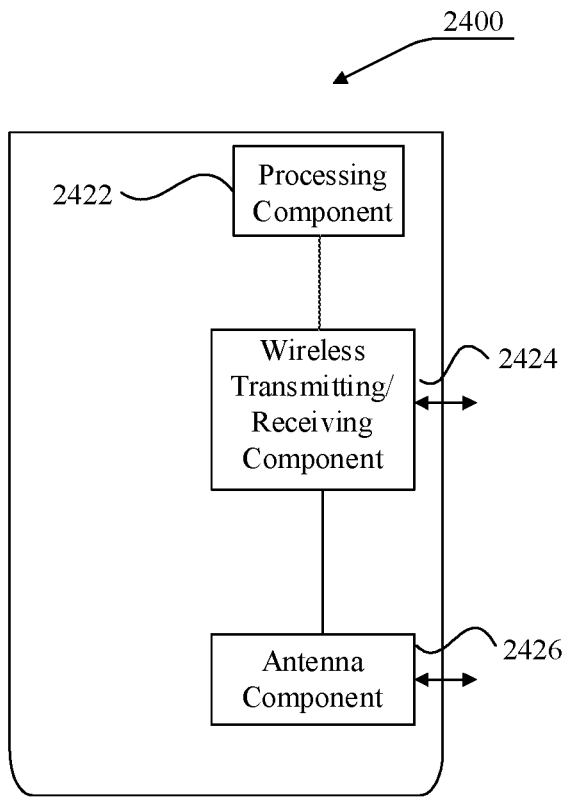
FIG. 24 is a schematic structural diagram illustrating an apparatus of wireless backhaul connection according to an exemplary embodiment.

As illustrated in FIG. 24, which is a schematic structural diagram of an apparatus of wireless backhaul connection according to an exemplary embodiment, the apparatus 2400 may be provided as an LTE base station. Referring to FIG. 24, the apparatus 2400 includes a processing component 2422, a wireless transmitting/receiving component 2424, an antenna component 2426, and a signal processing part dedicated for a wireless interface. The processing component 2422 may further include one or more processors.

One of the processors in the processing component 2422 may be configured to perform any of the methods of wireless backhaul connection as described above.

The present disclosure further provides an apparatus of wireless backhaul connection, the apparatus is applicable to a wireless backhaul base station, the wireless backhaul base station and donor base stations are located in a coverage area of the LTE base station, and both the wireless backhaul base station and the donor base stations are NR small cells; the apparatus includes:

a processor;

a memory, configured to store instructions executable by the processor;

wherein, the processor is configured to:

generate connection requirement information for donor base stations;

send the connection requirement information to the LTE base station, so that the LTE base station determines a first number of donor base stations required by the wireless backhaul base station for wireless backhaul connection according to the connection requirement information, and determines a second number of donor base stations that are capable of providing wireless backhaul service to the wireless backhaul base station.

Figure 25:
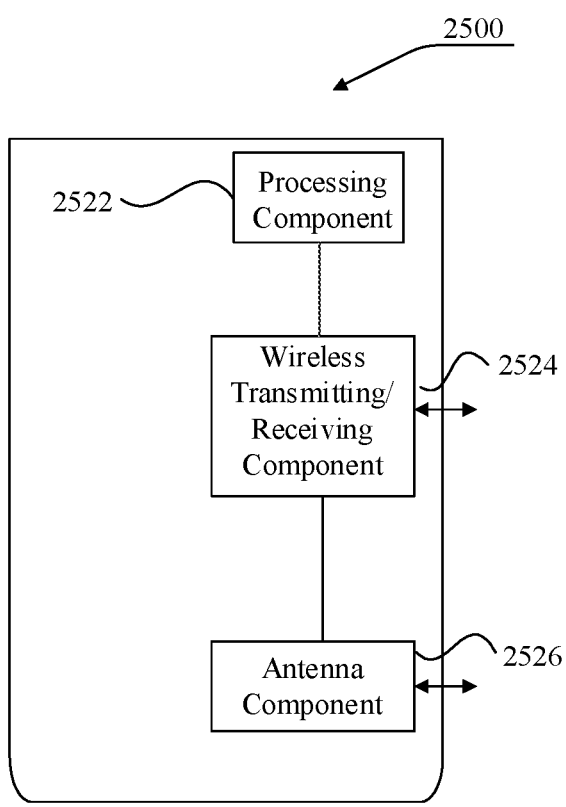
FIG. 25 is a schematic structural diagram illustrating an apparatus of wireless backhaul connection according to an exemplary embodiment.

As illustrated in FIG. 25, which is a schematic structural diagram of an apparatus of wireless backhaul connection according to an exemplary embodiment of the present disclosure, the apparatus 2500 may be provided as a wireless backhaul base station. Referring to FIG. 25, the apparatus 2500 includes a processing component 2522, a wireless transmitting/receiving component 2524, an antenna component 2526, and a signal processing part dedicated to a wireless interface. The processing component 2522 may further include one or more processors.

One of the processors in the processing component 2522 may be configured to perform any of the methods of wireless backhaul connection as described above.

One of ordinary skill in the art will easily conceive of additional embodiments of the present disclosure after considering the specification and practicing the disclosure disclosed herein. This application is intended to cover any variations, uses or adaptive changes of the present disclosure. These variations, uses or adaptive changes follow the general principles of the present disclosure and include common knowledge or conventional technical means in the art not disclosed in the present disclosure. The description and the embodiments are only to be regarded as exemplary, and the true scope and spirit of the present disclosure are set forth by the appended claims.

It should be understood that the present disclosure is not limited to the precise structure that has been described above and illustrated in the drawings, and various modifications and changes can be made without departing from the scope of the present disclosure. The scope of the present disclosure is only limited by the appended claims.

What is claimed is:

1. A method of wireless backhaul connection, comprising:
    determining, by a long-term evolution (LTE) base station when receiving, from a wireless backhaul base station, connection requirement information for donor base stations, a first number of donor base stations required by the wireless backhaul base station for wireless backhaul connection according to the connection requirement information;
determining, by the LTE base station, a second number of donor base stations that are capable of providing wireless backhaul service to the wireless backhaul base station; and
configuring, by the LTE base station, for the wireless backhaul base station, at least one donor base station for wireless backhaul connection according to the first number and the second number, wherein the wireless backhaul base station and one or more donor base stations are located in a coverage area of the LTE base station;
wherein configuring, by the LTE base station, for the wireless backhaul base station, the at least one donor base station for wireless backhaul connection according to the first number and the second number comprises:
selecting, by the LTE base station, when the first number is less than or equal to the second number, the first number of donor base stations that are capable of providing wireless backhaul service to the wireless backhaul base station, and configuring the selected donor base stations as donor base stations for wireless backhaul connection;
generating, by the LTE base station, a first notification message that comprises respective base station identifiers of the first number of donor base stations for wireless backhaul connection; and
sending, by the LTE base station, to the wireless backhaul base station, the first notification message so that the wireless backhaul base station determines the donor base stations for wireless backhaul connection according to the base station identifiers in the first notification message, and establishes connections with the determined donor base stations.

2. An apparatus of wireless backhaul connection, wherein the apparatus is applicable to a long-term evolution (DE) base station, the apparatus comprising:
a processor;
a memory, configured to store instructions executable by the processor;
wherein, the processor is configured to:
determine, when receiving, from a wireless backhaul base station, connection requirement information for donor base stations, a first number of donor base stations required by the wireless backhaul base station for wireless backhaul connection according to the connection requirement information;
determine a second number of donor base stations that are capable of providing wireless backhaul service to the wireless backhaul base station; and
configure, for the wireless backhaul base station, at least one donor base stations for wireless backhaul connection according to the first number and the second number, wherein the wireless backhaul base station and one or more donor base stations are located in a coverage area of the LTE base station;
wherein when the processor is configured to configure, for the wireless backhaul base station, the donor base stations for wireless backhaul connection according to the first number and the second number, the processor is further configured to:
select, when the first number is less than or equal to the second number, the first number of donor base stations that are capable of providing wireless backhaul service to the wireless backhaul base station, and configure the selected donor base stations as donor base stations for wireless backhaul connection;
generate a first notification message that comprises respective base station identifiers of the first number of donor base stations for wireless backhaul connection; and
send, to the wireless backhaul base station, the first notification message so that the wireless backhaul base station determines the donor base stations for wireless backhaul connection according to the base station identifiers in the first notification message, and establish connections with the determined donor base stations.

3. An apparatus of wireless backhaul connection, wherein the apparatus is applicable to a wireless backhaul base station, and the apparatus comprising:
a processor;
a memory configured to store processor executable instructions;
wherein the processor is configured to:
generate connection requirement information for donor base stations;
send, to a long-term evolution (LTE) base station, the connection requirement information so that the LTE base station determines a first number of donor base stations required by the wireless backhaul base station for wireless backhaul connection according to the connection requirement information, and determines a second number of donor base stations that are capable of providing wireless backhaul service to the wireless backhaul base station, wherein the wireless backhaul base station and one or more donor base stations are located in a coverage area of the LTE base station;
wherein the processor is further configured to:
receive, from the LTE base station, a first notification message that comprises respective base station identifiers of the first number of the donor base stations for wireless backhaul connection, wherein the first notification message is generated by the LTE base station in response to determining that the first number is less than or equal to the second number; and
determine the donor base stations for wireless backhaul connection according to the base station identifiers in the first notification message, and establish connections with the determined donor base station.

4. The apparatus according to claim 2, wherein the connection requirement information comprises an expected number of connections configured by the wireless backhaul base station;
when the processor is configured to determine the first number of a first donor base stations required by the wireless backhaul base station for wireless backhaul connection according to the connection requirement information, the processor determines the expected number of connections as the first number.

5. The apparatus according to claim 2, wherein the connection requirement information comprises an expected service type and/or an expected quality of service configured by the wireless backhaul base station;
when the processor is configured to determine the first number of the first donor base stations required by the wireless backhaul base station for wireless backhaul connection according to the connection requirement information, the processor determines the first number according to the expected service type and/or the expected quality of service.

6. The apparatus according to claim 2, wherein when the processor is configured to determine the second number of donor base stations that are capable of providing wireless backhaul service to the wireless backhaul base station, the processor:
configures a measurement parameter to measure each of designated donor base stations located in the coverage area of the LTE base station;
sends, to the wireless backhaul base station, the measurement parameter so that the wireless backhaul base station performs measurement on each of the designated donor base stations according to the measurement parameter so as to obtain a measurement result;
receives, from the wireless backhaul base station, measurement report information that comprises the measurement result; and
determines the second number of donor base stations that are capable of providing wireless backhaul service to the wireless backhaul base station according to the measurement result.

7. The apparatus according to claim 6, wherein the measurement parameter comprises at least one of following parameters:
a list of the designated donor base stations comprising each of the designated donor base stations;
a measurement quantity of specified measurement; and
a specified trigger condition for measurement.

8. The apparatus according to claim 7, wherein the measurement quantity of specified measurement comprises one or more of following measurements:
reference signal received power (RSRP); reference signal received quality (RSRQ); a load size; RSRP and the load size; or RSRQ and the load size.

9. The apparatus according to claim 7, wherein the specified trigger condition for measurement comprises a periodic trigger or an event trigger.

10. The apparatus according to claim 4, wherein when the processor is configured to configure, for the wireless backhaul base station, the donor base stations for wireless backhaul connection according to the first number and the second number, the processor:
generates, when the first number is greater than the second number, connection response information for the connection requirement information, wherein the connection response information comprises the second number;
sends the connection response information to the wireless backhaul base station;
configures, when indication information received from the wireless backhaul base station indicates acceptance of the second number, all of the second number of donor base stations that are capable of providing wireless backhaul service to the wireless backhaul base station as donor base stations for wireless backhaul connection;
generates a second notification message that comprises respective base station identifiers of the second number of the donor base stations for wireless backhaul connection; and
sends, to the wireless backhaul base station, the second notification message so that the wireless backhaul base station determines the donor base stations for wireless backhaul connection according to the base station identifiers in the second notification message, and establishes connections with the determined donor base stations.

11. The apparatus according to claim 5, wherein when the processor is configured to configure, for the wireless backhaul base station, the donor base stations for wireless backhaul connection according to the first number and the second number, the processor:
configures, when the first number is greater than the second number, all of the second number of donor base stations capable of providing wireless backhaul service to the wireless backhaul base station as the donor base stations for wireless backhaul connection;
generates a third notification message that comprises respective base station identifiers of the second number of the donor base stations for wireless backhaul connection; and
sends, to the wireless backhaul base station, the third notification message so that the wireless backhaul base station determines the donor base stations for wireless backhaul connection according to the base station identifiers in the third notification message, and establishes connections with the determined donor base stations.

12. The apparatus according to claim 3, wherein the connection requirement information comprises an expected number of connections configured by the wireless backhaul base station.

13. The apparatus according to claim 3, wherein the connection requirement information comprises an expected service type and/or an expected quality of service configured by the wireless backhaul base station.

14. The apparatus according to claim 3, wherein the processor is further configured to:
receive, from the LTE base station, a measurement parameter to measure each of designated donor base stations located within the coverage area of the LTE base station;
perform measurement on each of the designated donor base stations according to the measurement parameter so as to obtain a measurement result;
add the measurement result to measurement report information for reporting the measurement; and
send to the LTE base station, the measurement report information so that the LTE base station determines the second number of donor base stations that are capable of providing wireless backhaul service to the wireless backhaul base station according to the measurement result in the measurement report information.

15. The apparatus according to claim 14, wherein the measurement parameter comprises at least one of following parameters:
a list of the designated donor base stations comprising each of the designated donor base stations;
a measurement quantity of specified measurement; and
a specified trigger condition for measurement.

16. The apparatus according to claim 15, wherein the measurement quantity of specified measurement comprises one of following measurements:
reference signal received power (RSRP); reference signal received quality (RSRQ); a load size; RSRP and the load size; or RSRQ and the load size.

17. The apparatus according to claim 15, wherein the specified trigger condition for measurement comprises a periodic trigger or an event trigger.

18. The apparatus according to claim 12, wherein the processor is further configured to:
receive, from the LTE base station, connection response information for the connection requirement information, wherein the connection response information comprises the second number and is generated by the LTE base station in response to determining that the first number is greater than the second number;

generate, when the second number is accepted, indication information for indicating acceptance of the second number;

send, to the LTE base station, the indication information so that the LTE base station configures all the second number of donor base stations that are capable of providing wireless backhaul service to the wireless backhaul base station as donor base stations for wireless backhaul connection according to the indication information;

receive, from the LTE base station, a second notification message that comprises respective base station identifiers of the second number of the donor base stations for wireless backhaul connection; and determine the donor base stations for wireless backhaul connection according to the base station identifiers in the second notification message, and establish connections with the determined donor base stations.

19. The apparatus according to claim 10, wherein the processor is further configured to:

receive, from the LTE base station, a third notification message that comprises respective identifiers of the second number of the second donor base stations, wherein the third notification message is generated by the LTE base station in response to determining that the first number is greater than the second number;

determine the donor base stations for wireless backhaul connection according to the base station identifiers in the third notification message, and establish connections with the determined donor base stations.

* * * * *